(12) United States Patent
Jakobsson

(10) Patent No.: US 11,714,860 B2
(45) Date of Patent: *Aug. 1, 2023

(54) PUBLICLY VERIFIABLE PROOFS OF SPACE

(71) Applicant: Bjorn Markus Jakobsson, Portola Valley, CA (US)

(72) Inventor: Bjorn Markus Jakobsson, Portola Valley, CA (US)

(73) Assignee: Artema Labs, Inc., Venice, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 17/328,344

(22) Filed: May 24, 2021

(65) Prior Publication Data
US 2021/0279293 A1 Sep. 9, 2021

Related U.S. Application Data

(63) Continuation of application No. 16/353,440, filed on Mar. 14, 2019, now Pat. No. 11,017,036.

(60) Provisional application No. 62/642,851, filed on Mar. 14, 2018.

(51) Int. Cl.
| | |
|---|---|
| *G06F 16/95* | (2019.01) |
| *G06F 16/953* | (2019.01) |
| *H04L 9/32* | (2006.01) |
| *G06Q 20/06* | (2012.01) |

(52) U.S. Cl.
CPC ........ *G06F 16/953* (2019.01); *G06F 2216/03* (2013.01); *G06Q 20/065* (2013.01); *G06Q 2220/00* (2013.01); *H04L 9/3247* (2013.01); *H04L 2209/56* (2013.01)

(58) Field of Classification Search
CPC .. G06F 16/953; G06F 2216/03; G06Q 20/065
See application file for complete search history.

(56) References Cited

U.S. PATENT DOCUMENTS

| | | | |
|---|---|---|---|
| 10,554,407 B1* | 2/2020 | Greco | G06F 16/178 |
| 11,196,566 B2* | 12/2021 | Middleton | G06Q 20/10 |
| 2020/0204346 A1* | 6/2020 | Trevethan | H04L 9/3218 |

OTHER PUBLICATIONS

Examiner NPL from U.S. Appl. No. 16/353,440, https://iq.ip.com/disover, Jan. 14, 2021, 1 page.

(Continued)

*Primary Examiner* — Loc Tran
(74) *Attorney, Agent, or Firm* — Ryan, Mason & Lewis, LLP

(57) ABSTRACT

A verifying entity of a decentralized system is configured to receive information associated with at least one ledger entry of a distributed ledger of the decentralized system, to verify at least a portion of one or more computations associated with the received information, to generate evidence of at least one error in the at least a portion of the one or more computations associated with the received information, and to associate the generated evidence with a public key of the verifying entity. The decentralized system may comprise a proof of space based mining system, and the at least one ledger entry of the distributed ledger may comprise at least one proof of space for the proof of space based mining system.

19 Claims, 7 Drawing Sheets

(56) References Cited

OTHER PUBLICATIONS

S. Park et al., "SpaceMint: A Cryptocurrency Based on Proofs of Space," https://eprint.iacr.org/2015/528.pdf, 2015, 29 pages.
S. Dziembowski et al., "Proofs of Space," https://research-explorer.app.ist.ac.at/download/2274/5197/IST-2016-671-v1%2B1_796.pdf, 2015, 31 pages.

\* cited by examiner

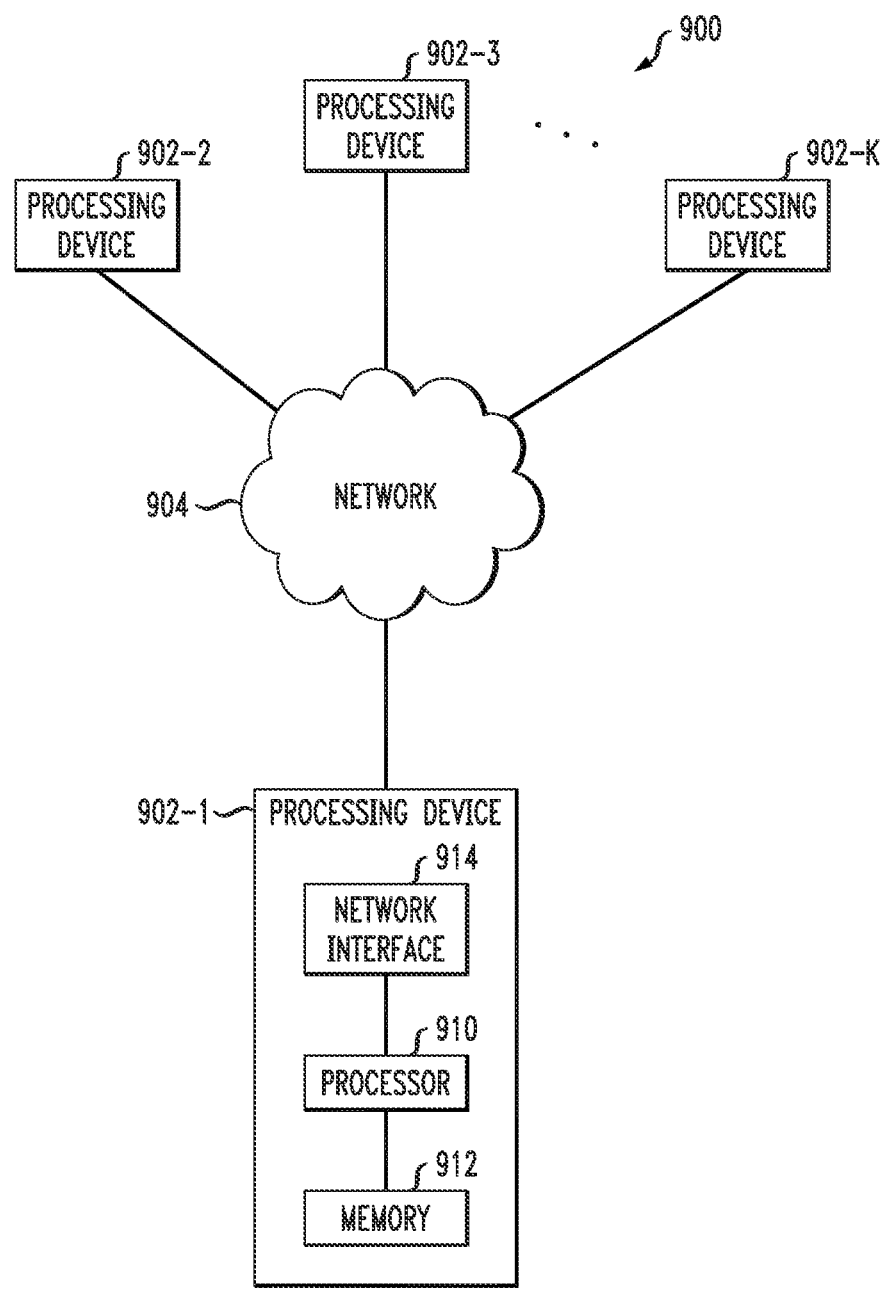

PUBLICLY VERIFIABLE PROOFS OF SPACE

RELATED APPLICATION(S)

The present application is a continuation of U.S. patent application Ser. No. 16/353,440, filed Mar. 14, 2019, and entitled "Publicly Verifiable Proofs of Space," which claims priority to U.S. Provisional Patent Application Ser. No. 62/642,851, filed Mar. 14, 2018, and also entitled "Publicly Verifiable Proofs of Space," each incorporated by reference herein in its entirety.

BACKGROUND

Cryptographic currencies, such as BitCoin, Ethereum and others, are based on Proofs of Work (PoW), which cost a significant amount of electricity for miners of the cryptographic currency and encourage bad behavior, such as using malware to mine the cryptographic currency on other users' computers, using of dorm rooms and other facilities for which electrical utility charges are included, etc. Proof of Space (PoS) based mining for cryptographic currencies and other applications have been proposed to address these and other problems. Many PoS based mining proposals, however, face a number of problems and challenges.

SUMMARY

Techniques are disclosed herein for a Proof of Space (PoS) based mining system, suitable for use in a wide variety of applications including but not limited to cryptographic currencies, time stamping, etc. PoS based mining systems disclosed herein are configured to provide secure mining while also lowering energy consumption requirements associated with mining, among other benefits. PoS based mining systems disclosed herein are configured with an ability to control the success of mining for mining operators or mining instances of different size, without favoring mining operators or mining instances with relatively larger capacity.

In one embodiment, an apparatus comprises at least one processing device comprising a processor coupled to a memory implementing a verifying entity of a decentralized system. The verifying entity is configured to receive information associated with at least one ledger entry of a distributed ledger of the decentralized system, to verify at least a portion of one or more computations associated with the received information, to generate evidence of at least one error in said at least a portion of the one or more computations associated with the received information, and to associate the generated evidence with a public key of the verifying entity.

In another embodiment, an apparatus comprises at least one processing device comprising a processor coupled to a memory, the at least one processing device implementing a mining operator entity of a decentralized system. The mining operator entity is configured to generate a challenge based at least in part on at least a portion of content of a distributed ledger of the decentralized system, to select, based at least in part on the generated challenge, at least one first node of a graph stored by the mining operator entity, to select, based at least in part on the at least one first node, at least one second node of the graph, to generate, based at least in part on the at least one second node, a response to the generated challenge, to determine a value of a quality function that takes as input the generated response to the generated challenge, and to submit, based at least in part on the determined value of the quality function, an entry to the distributed ledger, the entry comprising at least a portion of the generated response to the generated challenge.

These and other illustrative embodiments include, without limitation, methods, apparatus, networks, systems and processor-readable storage media.

BRIEF DESCRIPTION OF THE DRAWINGS

FIG. 9 shows an example of an information processing system that may be utilized to implement at least a portion of the FIG. 1 system.

DETAILED DESCRIPTION

Figure 1:
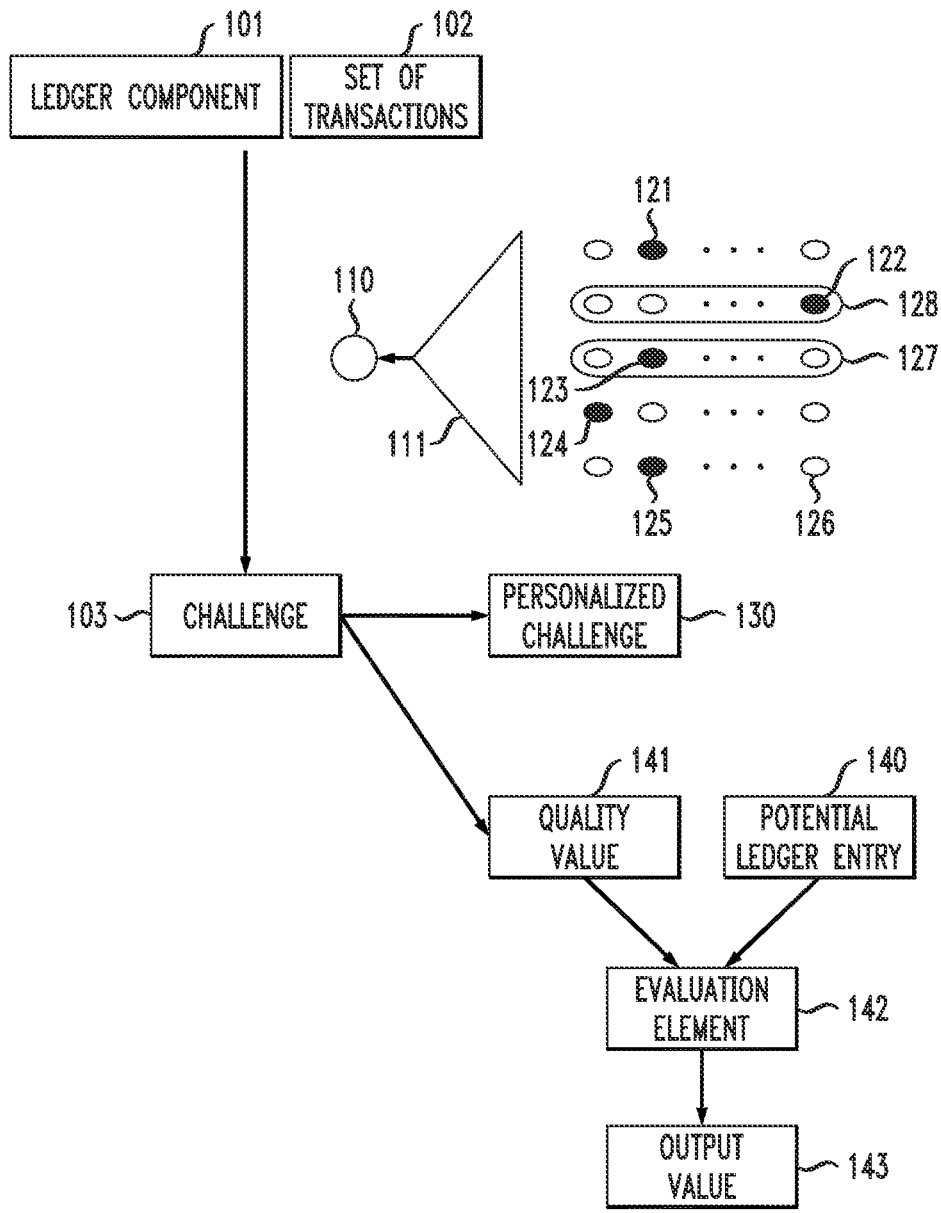
FIG. 1 illustrates an example of components in a Proof of Space based mining system, in accordance with an illustrative embodiment of the invention.

Illustrative embodiments will be described herein with reference to exemplary information processing systems and associated computers, servers, storage devices and other processing devices for generation and utilization of proofs of space.

As discussed above, Proof of Space (PoS) based mining for cryptographic currencies and other applications have been proposed to address various problems associated with Proof of Work (PoW) based mining systems. PoS based mining proposals, however, face a number of problems and challenges. For example, some cryptographic currencies based on PoS require large amounts of storage, which keeps small players out or forces them to participate using mining pools. Mining pools are another source of contention, as they are rife with fraud and cheating. Accordingly, it is desirable to avoid the need for mining pools. Some cryptographic currencies aim to avoid the complications due to different memory sizes by supporting different denominations, where low denominations can be mined with smaller resources and larger denominations require greater resources, where resources in the context of PoS based protocols correspond to storage space. However, this results in a hitherto unpublished type of grinding abuse where miners determine whether mining small-denomination coins, which would affect the ledger state, would affect their chances of successfully mining larger-denomination coins by way of manipulating the state of the ledger and therefore the challenges used for mining. This leads to abuses that current protocols and proposals are ill equipped to handle.

Still further, some cryptographic currencies are based on hybrids of PoS and PoW. Such cases inherit the problems of both PoS and PoW approaches. Thus, a need exists for addressing the problems of PoS and PoW based mining systems by developing technology to lower energy consumption for mining, thereby enabling mining for entities with vastly different capabilities without introducing new vulnerabilities leading to abuse and inequitable situations. By addressing the above-described and associated problems, a fair and sustainable cryptographic currency (or other PoS or hybrid PoS-PoW based mining system) can be developed, which has various benefits in addition to those associated with financial transfer. For example, hard drives and other storage can be manufactured and configured for instant mining, and sold ready to be used for PoS based mining. This is likely to help defray costs of storage for individuals and organizations, increase sales of storage hardware, and therefore also lower the per-unit costs due to an increase of the market size. A shift to PoS based mining may also reduce the incentives for malware authors to attempt to corrupt computers and other computational devices to use them for mining purposes. This is because it is difficult for a user to know whether his or her equipment is used for PoW based mining, as malicious and unwanted mining processes could automatically hide themselves as the user engages with the device, and the only trace might be an increased power bill. In contrast, the constant use of large quantities of storage is easily detected using standard screening methods, and is less easily hidden from end users. It is to be appreciated that the above-described advantages are presented by way of example only. There are many additional benefits associated with addressing the needs of generating secure and equitable cryptographic currencies that inhibit undesirable behavior, encourage desirable behavior, and reduce energy consumption.

Techniques are disclosed herein for use with PoS and other mining schemes. PoS based mining schemes described herein may be used for various applications, such as for cryptographic currencies, time stamping, related functionality, etc. The techniques described herein disincentivize undesirable behaviors such as grinding and avoid undesirable situations such as mining pool fraud while improving security and lowering the energy consumption requirements for mining.

PoS based mining schemes described herein use methods for controlling the success of mining for mining instances of different sizes, thereby making mining equitable and fair with respect to the storage capacity of the mining instances. This is done without favoring mining instances with large capacity, thereby removing the need for mining pools, and avoiding the need for multiple denominations. Doing this has security benefits that will be enjoyed both by individual mining operators and by the community at large. In particular, the design supports avoidance of grinding attacks, and avoids hijacking attacks in which a powerful entity is able to lock other miners out by overwhelming the marketplace.

Grinding is a form of abuse in which a miner makes minor modifications to a context, in order to find one such context that results in a challenge for which it has a legitimate response—where a response is the same as a successful mining effort. Grinding is a problem that is unique to PoS, since the success is defined by what the miner has stored relative to a challenge. If all miners practice grinding, that really turns a PoS scheme into a hybrid PoS/PoW scheme, thereby losing the benefits associated with PoS, without necessarily gaining any benefits. Grinding can lead to one or more miners being able to generate a steady stream of ledger entries, such that they always have the answer to the next challenge. This can lead to the exclusion of others, and hyperinflation of a cryptographic currency.

Furthermore, automated and event-driven parameter change methods allow for fine-tuning of parameters over time, thereby creating an autonomous community of miners that self-balances to address imbalances created by changes in technology, changes in the marketplace, and changes in Internet communication speeds. These and other auxiliary dependencies can otherwise negatively affect the security and well-being of the marketplace. Enabling fair and equitable mining that supports security requirements and which is not costly to operate will increase the marketplace of cryptographic currencies and enable broader participation, which will have a stabilizing effect on the resulting currencies and their use.

In some embodiments, a quality assessment value is derived from a public value, such as: the ledger; a counter indicating the length of the ledger; a challenge computed from the ledger; a mining instance and its size; a public event description; or a combination of one or more of these and other types of values. In some embodiments, it is beneficial if the extent to which the quality assessment value can be influenced in a deterministic manner by one or more miners is minimal. For example, it is not desirable that the quality assessment value depends on a value that can be manipulated by a miner. The quality assessment value indicates whether a challenge provided to a mining instance is valid, whether a response to a challenge generated by a mining instance is valid, or a combination of both. If the quality assessment value indicates invalidity, the corresponding challenge and associated response are not legitimate ledger entry inputs in the context of the associated mining instance, meaning that the associated response to the challenge cannot be used to close the ledger, and therefore is not a successful outcome of a mining attempt. On the other hand, if the quality assessment value indicates validity, this does not preclude the challenge and associated response, if found, from being submitted as a ledger entry. In other words, such challenges and responses are valid, assuming they are well formed, and will be considered by other miners as being valid ledger entries presuming they are received on a timely basis, relate properly to the observed transaction values submitted to the ledger, and satisfy other related and well-understood measures of correctness. The quality assessment measure is preferably computable with very limited resources. In some embodiments, quality assessment measures are computed by performing a small number of operations, some of which may result in a state that a mining operator stores and does not need to be recomputed. An example quality assessment selects a portion of a string, such as a challenge string, and compares the selected portion to a pre-stored bit string, outputting "valid" if the two are equal. Another example quality assessment performs two or more such selections and comparisons, outputting valid if any one of the comparisons result in a match. More complex and demanding quality assessment measures can also be computed, although generally it is beneficial in some embodiments for the quality assessment measures to require a minimum of resources to compute or verify.

Techniques described herein in some embodiments relate to the administration of mining, including: the decentralized determination of what ledger entries are selected; setup of individual mining instances; operation of a mining instance, including the determination of whether a challenge, response or a combination thereof are valid in a given context; and the automated re-parameterization of publicly available configurations governing the operation of the ledger, the mining entities, and any other entity performing transactions or verification related to transactions. Although some embodiments are described herein in the context of a PoS-based mining scheme, it should be understood that the techniques described herein are also applicable to a PoW-based mining scheme, or any PoS/PoW hybrid, as well as mining schemes based on other types of resources, such as secure data storage, communication bandwidth, specific processing capability corresponding to ability to evaluate a function of choice, and any other mining scheme based on proving access to a resource, whether physical or logical in its nature. The disclosure relates both to the retrofit of insecure or otherwise undesirable schemes of this nature by application, among other things, of the quality assessment process disclosed, and to the design of schemes around the described processes and methods.

In some embodiments, a miner selects one or more seed values, each represented by a value s, and then computes a collection of leaves in a Merkle tree from s by applying a one-way function to s. For example, if the leaves are numbered 0 . . . n−1, the miner generates the jth Merkle leaf as f(s,j), where f is a one-way function such as a cryptographic hash function. In some embodiments, f is the function SHA256. As a result, an array of n leaves are generated, where n is preferably a power of two. From the leaves, n internal node values are generated by applying, to each leaf, a one-way function such as a hash function h. These n internal nodes are then concatenated pairwise, resulting in n/2 pairs, where each such pair is then hashed, resulting in n/2 internal nodes on the next level. This is repeated until only one resulting value is generated, where this resulting value will represent all the n Merkle leaf values generated from s. We refer to this value as the public key pk corresponding to the seed s. The miner generates a leaf value for the mining from the root value R, a path value i, and a public key pk, where the leaf value is represented by leafi. The miner then stores (leafi, i, s). The same value s can be used for multiple leaf values, however it is beneficial for the miner to have multiple values s in use, as when all leaf values of the Merkle tree corresponding to one value s have later been disclosed, they are no longer secret to other parties. In some embodiments, there are different seed values such as s1, s2, . . . , sk, where each of the seed values sr is computed as a one-way function of a master secret MS and a value r. In some embodiments, the value r is the same as the path value i, meaning that each value leafi corresponds to a unique seed si, computed as h(MS,i). In this case, the miner need not store the seed value for each leaf value leafi as the seed value can be computed from i. The miner instead only needs to store one master seed MS and a collection of values (leafi,i).

When a miner receives a challenge c, it determines what leaf matches the challenge using a matching function. If a leaf value leafi matches c, then (i,pk) is a witness to the challenge. The miner discloses (i,pk). A miner that has not stored pk re-generates this from the seed value, which may also need to be generated, namely from a master seed MS and a path value i. Here, MS is stored securely by the miner and i is extracted from the record, which is also stored securely. Given the seed, the miner can now re-compute the Merkle tree and pk. In addition to disclosing (i,pk), the miner discloses a Merkle signature corresponding to pk, on a message that preferably comprises two elements: a second public key P; and the set of transaction values T that the miner has observed. To do this, as is standard for Merkle signatures, the miner computes a hash of the message, i.e., of (P,T), where this hash value, call it H, is used to select from the n Merkle leaves used to generate pk, and the interval values generated from the Merkle leaves that were not selected. It is to be appreciated that this is only one example use of a Merkle signature, and that other approaches may be used including but not limited to selecting values using the computed hash and a count of how many zeroes there are in the computed hash. The result is a Merkle signature on (P,T), using the public key pk. This is a ledger value.

To verify a ledger value, a verifier verifies the Merkle signature on the provided message (P,T) using public key pk, and verifies that T corresponds to a set of posted value transactions. The verifier then generates leafi from (R,i,pk), where R is a public value associated with the mining. The verifier also verifies that leafi matches the challenge c, and determines that this challenge is correct. In some embodiments, c is computed as the hash of a value that is the concatenation of the most recent ledger entry, and the transactions T' that were signed in the most recent ledger entry. Preferably, the challenge c is not computed using the most recent (and unsigned) transactions T as input, so as to avoid so-called "grinding" where a miner determines what transactions to use as input in order to increase its chances of successfully solving the proof of space. In the above, P may be an RSA public key or a DSA public key.

In some alternative embodiments, a leaf value leafi is computed as a hash h of (R, P, pk, i), where different leaf values may use different public keys P, but do not have to. In this context, a witness corresponds to the triple (P, pk, i), and is submitted by the miner to the ledger along with a Merkle signature using public key pk on the most recent set of transactions T that have not been signed in previous ledger entries. Thus, pk is not used to sign the other public key P in this embodiment. This is beneficial in that it further reduces the risk for grinding, as the miner's actions are predetermined and the miner cannot select a public key P on the fly with the goal of increasing the odds at correctly responding to a future challenge. To verify a ledger entry of this type, a verifier generates a leaf from (R, P, pk, i), determines that this leaf value matches the challenge c, and verifies that the associated Merkle signature using pk is a valid signature on the concatenation of the most recent ledger entry and the set T' of transactions signed in the most recent ledger entry. In some embodiments, the Merkle signature is on a message that comprises only the most recent ledger entry, and not the corresponding set of transactions T', as these are implicitly part of the ledger entry by means of the Merkle signature in the most recent ledger entry.

In some embodiments, the miner, having found a leaf value that matches a challenge c, will use the Merkle public key pk associated with the seed leaf, and the associated leaf and node values, to generate two signatures. This can be done by partitioning the nodes of the Merkle tree into two parts, where the first part (such as the first half) is used to generate a first signature and the second part is used to generate a second signature. This only requires that there are a sufficient number of nodes, e.g., using n=512 allows for using 256 leaves and associated nodes for each of the signatures. The first signature is associated with the previous ledger entry, and the second signature with the set of transactions that have not previously been signed in a ledger entry, but which have been posted. Thus, the ledger entry comprises values (leafi, pk1, pk2, P, i, sig1, sig2, T) where pk1 is the Merkle public key for the first Merkle signature sig1, pk2 is the Merkle public key for the second signature sig2, and T is the set of transactions or references to these. As before, P is a public key of a minted coin and i is the path. Here, sig1 is a signature of portions of a previous ledger entry—in particular, on the values (leafi, pk1, pk2, P, i), but not on sig1, sig2 or T of that ledger entry. This is done by computing a first hash on (leafi, pk1, pk2, P, i) and using that to select what leaves of the Merkle tree associated with pk1 to reveal versus what internal node values to reveal. A second hash on the current (unsigned) transactions T is computed and used correspondingly for a second Merkle signature corresponding to pk2. Here the challenge c is set as a function of values (leafi, pk1, pk2, P, i) for the most recent ledger entry, where the function may be a hash function, potentially using a padding unique for the purpose of deriving challenges, and not used in other contexts. This way, challenges do not depend on the transactions, and grinding is not possible other than to a very limited extent in which a miner with a small set of valid responses to a challenge, as opposed to only one such response, decides what selection is most beneficial and uses that.

Constructions such as "SpaceMint: A Cryptocurrency Based on Proofs of Space" (https://eprint.iacr.org/2015/528.pdf) suffer from several problems. One design choice that is made in this particular approach and related approaches is that different users can set different configurations and parameters based on their independent memory constraints, each resulting in a proof of space that, given the space it is configured for, is likely to succeed. This means that two miners with very different memory sizes will have very different Proof of Space instance sizes, but similar probability of success. To make this fair, the values of successful mining efforts for two such miners is set to be proportional to the memory space the configuration requires. One dramatic drawback of this is that miners can create configurations that result in very low-value mining, but where the mining can be effectively produced at a very high rate. This leads to a problem with grinding, as a miner can effectively dominate the mining by generating a very rapid stream of low-value ledger entries. Moreover, such a miner can practice grinding based on having two configurations: one low-value configuration that enables the miner to produce ledger entries at a breakneck speed and choose collections of these to be posted, such that a chosen collection will maximize the probability of success for the mining of the high-value mining effort. Whereas the authors of "SpaceMint" designed constructions in which challenges would be delayed for multiple rounds of ledger entries to avoid grinding attempts, an attack like this very easily circumvents those protections. To address that problem, it is necessary to use a configuration in which a successful mining attempt is always valuable, and equally valuable, independently of a miner's memory resources, but where the probability of success of the mining is proportional to the memory resources put to use. Then, it is no longer rational to configure many small instances of the PoS, since this would not lead to any increase of mining success. Furthermore, and for the same reasons, such an improved system would not be vulnerable to the grinding attack described above. To allow for this improved functionality, one would start with a mining method that is secure but for the grinding attack described above, and then change the policy so that all successful mining attempts result in the same value, provided the ledger entry is selected. In addition, a mining attempt that in a non-corrected design would have been considered legitimate will only be legitimate if it, in addition, also satisfies criteria that is probabilistic, and for which the probability of success is proportional to the maximum space the system is designed to use. For example, for a system that is designed to use up to a quantity N of memory space, but which is configured by a given miner to use N/8 space, the success of mining should be only ⅛ of the success of the pre-corrected scheme for the given miner. This can be achieved by requiring a bit pattern among one or more of the elements that is only achieved with a probability of ⅛. For example, a three-bit binary string can be selected using a pseudo-random generator taking the challenge as input, and only when a checksum or a particular output value ends with that bit string is the corresponding output considered a legitimate mining effort. This is very powerful, and can be adjusted in many ways. For example, to select a setting with ¾ size of the maximum space, three two-bit bit strings can be generated by the pseudo-random generator, and if one of the bit strings is matched in the least significant bits of the target values, then the mining result is considered legitimate. In some embodiments, further benefits are provided by not always selecting the same bit positions for comparison. For example, if p is a position of a string that is generated by the pseudo-random generator, and from this position on in the mined output, and for r bits, there is a comparison with one or more target bit strings, then the probability of success is the same as if the least significant position of the target value is used for comparison. This, however, forces the miner to store all bit values instead of only some. Further, this does not change the computational complexity of verifying a mining attempt, since it can still be a log-time search of one or more target values.

In a 2015 publication, "Proofs of Space" (https://pdfs.semanticscholar.org/fe7c/1437c4da50f9fd9cfadc8a1ac6c59ea3ffe5.pdf), Stefan Dziembowski, Sebastian Faust, Vladimir Kolmogorov and Krzysztof Pietrzak describe a construction that can underlie a proof of space, and which can be configured to different memory sizes. Starting with a directed acyclic graph (DAG) that is hard to pebble, a prover commits to its nodes using a hash tree, proves in an initialization phase that it is able to open up challenges corresponding to nodes selected by a verifier, and later, in a proof of space phase, provides similar proofs to new challenges. The challenge can be set as the result of a one-way function that takes as its input a description of the tree-and-DAG graph and produces a pseudo-random output. This is commonly referred to as a random oracle. The problem with this design is that where it can be adjusted to different memory sizes, the probability of success for a non-cheating prover is always 100%. Furthermore, different memory sizes would require different coin values associated with the memory size, or the construction would favor cheaters that register several small memory sizes to set up multiple trees. By applying a qualifying function to any valid output of this or a similar PoS, such PoS designs can be altered to level the playing field, making the success of the associated mining a function of the amount of storage space available to the prover/miner. In particular, the success probability can be set to a function that is linear in the amount of space, up to a maximum amount of space. Choosing a linear relationship means that there is no incentive for cheating miners to set up multiple smaller instances in order to perform grinding attacks, since their probability of success would not be affected by this relative to using all of their available space for one larger instance of PoS storage.

In some embodiments, the qualifying function preferably is a matching function that computes a hash or other description of the response to the challenge provided by the underlying imperfect scheme, and compares a portion of the hash or other description with a target value. For a miner with half the maximum space used, the portion to be compared would be a 1-bit long portion, e.g., the least significant bit (LSB) of the string produced by the hash function, or the LSB of the description otherwise generated from the response of the underlying scheme. The comparison would be made with a value that in some embodiments is a fixed value, such as the value '1'. It is to be appreciated that in other embodiments other positions may be compared, not just the LSB, as long as the position is specified by the scheme. Furthermore, a miner with one fourth of the maximum space would compare a two-bit portion, such as the two most significant bits (MSB) of the result of the challenge, this again compared preferably to a fixed string such as '11'. This miner has the same chance of success per memory space as the one that has twice as much memory, and for which the comparison was made on one bit only. To accommodate for miners with 3/16 of the maximum space, for example, a four-bit portion would be compared, creating sixteen possibilities, out of which three patterns would be set as acceptable and lead to a successful mining. For example, a four bit comparison string represented by the bits a, b, c, d could be said to succeed when (a,b,c,d)=(1,1,1,1), or (a,b,c,d)=(1,0,1,1), or (a,b,c,d)=(0,1,0,1). This means that this miner would succeed in exactly 3/16 of the cases where the underlying scheme outputs a valid response to a challenge. Again, this means that the scheme is fair, and that the probability of success for the miner is directly proportional (and linear) to the amount of space the miner uses for the PoS storage. For a miner that operates with the maximum space, no comparison would be made, with all underlying responses being considered valid. This construction is also useful to reduce the probability of successful mining for all parties, e.g., to a setting where the probability of success for a miner with maximum storage is 1/1024, whereas the probability of success for one with half of the maximum storage is 1/2048. Here, maximum storage corresponds to an amount set by the system as the largest PoS size accepted, and can be any arbitrary size. This is achieved by adding ten bits to the comparison portion for all miners, causing the maximum size miner to apply a ten-bit comparison and the half-maximum miner to apply an eleven-bit comparison. In some embodiments, this is preferably done in two rounds: a first round on ten bits (for the common reduction in success), followed by a size-dependent comparison, which would be "always success" for the maximum size miner, a one-bit comparison for the half-size, and the same four bit comparison described for the 3/16 miner.

In some embodiments, PoS schemes may use a non-linear reduction as well. For example, the matching used for all miners (in the above example, on a ten-bit string) could also be done to a longer string, such as a 20-bit string, and success could correspond to any output with a Hamming weight exceeding a threshold, with a result that if interpreted as an integer would exceed a threshold value, etc. This is beneficial as it allows a nimble approach to reducing (or increasing) the success probability in a scheme, set by a central authority or set as a function of past events, a time, a volume of traffic, a coin value, etc. In other words, the probability could be linked to external events, such as "decrease the success probability by 1%" when the trading price of the coin exceeds $1000, or any arbitrary pre-set function that can be publicly verified.

Thus, one aspect of the disclosed technology is a qualifying function that transforms a collection of PoS instances with different associated memory sizes to a probabilistic PoS for which the probability of successful mining can be tailored by setting the parameters. One set of parameters reduces the overall probability of success, as described above, and can preferably be a function that is modified over time, where the modifications can be automatic and depend on publicly observable events, but which can also be manually generated and announced, or be automatic and depend on an event that is not publicly observed. In the latter case, the announcement of the change of the policies should preferably be made at least one ledger entry before it takes effect, where the announcement should preferably be made in the form of a transaction being added to the ledger. A second set of parameters adjusts the probabilities of success for different-sized PoS instances according to a reduction formula that preferably is linear based on the size of the PoS instance, but which can also be another function. For practical purposes, the reduction formula may only apply to discrete PoS sizes, such as 16 MB, 32 MB, 64 MB, etc., but not sizes in between the discrete PoS sizes. The qualifying function can also be applied to two or more small instances of a mining scheme that a miner runs. For example, a miner may run one 64 MB and one 32 MB instance of a PoS scheme. The qualifying function would be applied to both of these instances, determining for each whether an associated mining attempt of the underlying scheme should be reported as a successful mining or not. The qualifying function determines for each one of such instances, which may be of the same or of different sizes, whether the mining attempt matches the qualifying function, and accordingly, should be posted of a ledger as a ledger entry. As an entry is posted, the same qualifying function, operating on the same inputs as it was for the posted ledger entry, is evaluated to determine whether the ledger entry should be accepted or not. This is typically done as part of the verification of ledger entries, which is performed by miners in order to determine the current state of the ledger.

This qualifying function can be applied to any underlying mining scheme, including PoS schemes, PoW schemes, and hybrids of these, as well as other mining schemes relying on other types of resources, and not time and space. The qualifying function is applied to an underlying mining scheme by generating a match string from at least part of the ledger entry of the underlying mining scheme, or at least part of the challenge associated with the ledger entry, or at least part of a description of the instance of the underlying mining scheme. The match string is preferably not possible to influence for a miner, but depends on data that is public, on data that the individual miner does not have direct control over, except for in a binary sense by either mining or not mining a coin. Thus, it is beneficial for the match string not to be a function of recent transactions that have not yet been committed to by a ledger entry, or a cheating miner can perform a grinding attack in which multiple tentative transactions or other events are tested to determine if any one of them, if made public, would create a successful mining event based on the evaluation of the qualifying function on the underlying mining scheme. This is analogous to how the challenge to a PoS instance should preferably not be a function of data that can be controlled by a cheating miner. The qualifying function can also be directly built into mining schemes, and not applied to underlying schemes, thereby resulting in the beneficial functionality.

In some embodiments, the quality assessment is applied to the output of an underlying mining scheme, thereby assessing whether the generated tentative ledger entry is valid or not, given the reduction of the success probability mandated by the scaling of success based on the size of the PoS instance. In other embodiments, the quality assessment is instead applied to the challenge value, thereby determining whether this is valid in the context of a given PoS instance, based on the size of the PoS instance, and preferably based on publicly available information associated with one PoS instance but not another.

In some embodiments, the quality assessment is computed by comparing a counter to a target value, where the counter relates to the number of the ledger entry to be computed according to a count or offset count of these, and where the target value and its selection depends on at least one of the associated PoS instance, a size parameter value associated with the PoS instance, etc. For example, consider a PoS instance whose size indicates that only one out of 2000 challenges should be considered valid. Consider further a quality assessment engine that determines whether the counter associated with the ledger entry to be computed, modulo the value 2000, matches a constant such as a value from 0 to 1999 that is deterministically determined from a portion of the PoS instance, such as its public representation value, or matches a value associated with the public identity of the miner, or another publicly verifiable value or part thereof. This example quality assessment is straightforward and a priori deterministic in that a miner can anticipate when a challenge will be valid, which has some benefits such as improved scheduling. However, there are benefits associated with deterministic quality assessment methods that are not possible to evaluate a priori, such as a better security against targeted attacks such as targeted Distributed Denial of Service (DDoS) attacks, due to the fact that it is not a priori knowable whether a particular miner can engage in a particular challenge or not. This can be achieved by making the quality assessment function be a function of the challenge and a public descriptor, in which case it is only publicly computable whether a mining instance is relevant or not in the context of a particular challenge once that challenge is known. A solution that further strengthens this security involves computing the quality assessment value based on the response to a challenge. This has the benefit that external parties cannot determine whether a particular miner can produce a valid response to a challenge until the miner itself publishes such a response. This protects miners from the risk of targeted DDoS attacks aimed at miners that can be publicly determined—a priori or at the time the challenge is computable—to potentially being able to generate a valid response to the challenge. This is therefore a beneficial security measure in contexts where DDoS risk is a concern. Other approaches of achieving this last benefit involve basing the quality assessment on a value that is not publicly known, but for which a one-way image is publicly known or verifiable, thereby allowing a miner to prove having a valid number in order to show that a challenge/response pair is valid. To make this repeatable, a hash chain or Merkle structure can be used, where the root is part of the publicly registered value associated with the mining instance.

In some embodiments, the material stored by a PoS instance comprises a collection of nodes associated with a DAG, where nodes that depend on others have values that are functions of the values of the associated nodes on which they depend. For example, the function may be a one-way function, such as SHA-1. In such an example, one node in the DAG may be a function of three other nodes, and may be computed by concatenating the values associated with these three nodes and applying SHA-1, assigning the result of the computation to the node depending on these three parent nodes. One or more nodes in the DAG will not have any parents, but will be generated, preferably in part as a pseudo-random string, by the miner or an entity associated with the miner. Mining will comprise revealing at least a subset of the nodes, meaning making public the values associated with these nodes. In addition, the nodes are also sometimes associated with a Merkle tree or other authentication structure. In the case of the Merkle tree, as a subset of nodes is revealed as part of mining, then corresponding nodes in the Merkle tree are also made public in order to authenticate the revealed values and allow a verifier to determine their authenticity relative to a value associated with the Merkle tree structure. The intention of PoS based mining associated with a structure like this is to force a miner to store a very large portion of this associated data structure in order to have a high chance of being able to find a subset of nodes (referred to as a response), that is valid in the context of a challenge or a personalized challenge, which is a type of challenge that is modified to be consistent with the size of the mining instance. In some embodiments, one part of the personalized challenge is the quality measure value used to determine whether a mining instance is valid. Preferably, another part of the personalized challenge is used to generate a response, based on the stored data, where the response corresponds to a proof of space. In some embodiments, the same or overlapping portions are used to generate the response and to evaluate the response using the quality measure. The quality measure value is used to assess whether the proof of space is a valid ledger entry.

However, one form of potential abuse relative to a structure like this is what is referred to herein as scrolling. Consider for concreteness a structure in which nodes are organized in a matrix, in which all nodes associated with one row depend on nodes in the row above, e.g., the upper row comprises the parent nodes of the nodes in the lower row. Assume that the size of this structure is 100×100. One adversarial abuse is to generate a 100×101 sized matrix, or a 101×100 sized matrix, and then create two mostly overlapping 100×100 matrixes from this, corresponding to two individual mining instances, where each such mining instance has a success probability associated with its size, but where the two derived matrices require essentially the same amount of storage as one matrix would have, i.e., using a form of compression. This, of course, can be done iteratively, e.g., using a 100×105 matrix to create size different but overlapping matrices, or even more if the columns can be reordered. This is a powerful form of cheating. In order to prevent this, each node is assigned a position, which in a 2-dimensional matrix like the one in this example would correspond to an x and y value. In addition, each node is also associated with the size of the matrix, e.g., 100×100, which is represented by the value S. Instead of taking as input a value v of one or more nodes when computing a new node value with the input values being its parents, we take the tuple (v, x, y, S) as input, or the collection of such tuples where more than one parent exists. Thus, the new value computed from these parent nodes will depend on the positions of the associated nodes and values, and this form of "scrolling" abuse is not possible. For simplicity of denotation, this is not called out in the figures, but is assumed to be used when desirable and applicable.

Another form of abuse that could affect PoS based mining schemes is a form of compression that involves generation of a PoS mining instance, including registration of a value associated with the instance, when applicable, followed by storing of only a portion of the instance such as the seed from which it was computed or some subset of the values it comprises, followed by the generation of another mining instance, as above. Then, during mining, the miner can determine whether one mining instance results in a valid response, and if it does, submit the corresponding response to the challenge as a ledger entry, but if it does not correspond to a valid response, then re-generate another mining instance from the seed or other values representing it, and determine whether this second mining instance provides a correct response to the challenge. A more severe version of the attack is that the one or more values that the cheating miner stores can be used to determine whether the mining instance will, or will be likely to, generate a valid response, and selectively regenerate only those mining instances that provide the best probability of mining success. This abuse can be considered as an attack with "regeneration of compressed mining instances." However, the same type of abuse also applies when there has been no prior generation of the instance, and instances do not have to be a priori registered, e.g., by submitting a representative value as part of a transaction to the ledger. To counter these types of generation-based abuses, it is sufficient that the expected time of generating a mining instance exceeds the time during which a ledger entry typically remains open before a miner succeeds in finding a valid response to the current challenge, and closes the ledger by submitting a ledger entry comprising the valid response. This can be achieved by replacing some of the functions used with slower functions filling the same need. For example, instead of computing a SHA-1 of a collection of values corresponding to parents of a node to determine the value of the child node, some embodiments can compute a function that corresponds to the 1000-time serial application of SHA-1, meaning that SHA-1 would be applied to the values of the parent nodes (along with the associated coordinates, as described above), and the result of that application is hashed, using SHA-1, and the result of that last SHA-1 application is hashed using SHA-1, etc., until a total of 1000 SHA-1 applications have been applied. In one variant of this approach, an additional parameter such as a counter is also included in the input of each SHA-1 round, and if the result of that round does not satisfy a criteria, such as having 0 as its least significant bit, then the round is re-done with a new counter value, such as increased by one, to determine whether that satisfies the criteria. This would be repeated for at least a portion of the hash function applications in the series. It is to be appreciated that this leads to a slowdown of the derivation process, and that the degree of this slowdown depends on the number of bits that are matched to determine the criteria. A variety of criteria can be used, such as comparing multiple bits with zero, or with another target string, or to compare that some arithmetic constraint is satisfied, such as the result being divisible by 5, etc. Such approaches can be applied to a wide variety of hash functions, not just SHA-1, and also to various other functions which are not hash functions.

In some embodiments, one benefit of using functions that are slow to evaluate, at least during their first evaluation instance, is that it prevents cheating in which an abusive miner stores two or more compressed mining instances and decompress these one by one in order to evaluate whether the mining instance provides a successful response to a current challenge. An additional benefit is that it simplifies the setup of mining instances in that the miner does not have to register the mining instance by submitting a state representing the mining instance to a public forum such as the ledger prior to being able to engage in mining activities using the mining instance.

When a verifier, including another miner, wishes to verify a submitted ledger entry, in some instances the verifier would have to perform the "expensive" function to verify some of the nodes, such as in the example with the 1000-iteration SHA-1. However, where counters are used, the verifier would only have to know the value of the input to the hash function, just as in the example in which the result had to be divisible by 5. In other contexts, it is sufficient for a verifier to determine that there is a preimage to a node value, in which case the miner submitting the ledger entry can provide this number, which in the iterated-SHA-1 example would correspond to the second to last value in the chain of hash function applications, i.e., the preimage to the node value. In some embodiments, some verifiers are satisfied with this, whereas other verifiers, which we may call bounty hunters, verify each step of the computation, and if they find an error, then they submit evidence of this in return for some reward, thereby also invalidating the incorrect ledger entry and, potentially based on a policy, all subsequent ledger entries. Such proof could be submitted in a manner that is associated with a public key, in which the bounty hunter proves knowledge of the error, and of the secret key associated with a public key, thereby assigning value (namely the bounty) with the public key. In other embodiments, the proof is a proof of knowledge, and is of either the error or of the secret key corresponding to the public key, or both. In some embodiments, this is done by submitting a first transaction that comprises a public key and an encryption of the evidence of error, where the encryption uses a key not related to the public key such as a randomly selected Advanced Encryption Standard (AES) key. Then, in a subsequent time period, the bounty hunter would provide the AES key or other decryption key, allowing anybody to access the evidence. If the evidence in question has not been submitted before, this would automatically invalidate the ledger entry that is proven wrong and provide the bounty hunter with value, such as the value of $\frac{1}{100}$ of a coin, where a coin corresponds to the value obtained by successful mining. An example of evidence of error in one example comprises a value that is a preimage to the node, but which, when the iterated hash function is applied, does not produce the correct node value. This can be derived by a bounty hunter that obtains access to a sufficient number of preimages to derive what the node values should be.

In other embodiments, a regular verifier verifies that the response to the challenge corresponding to the ledger entry is consistent with the already publicized Merkle tree value associated with the mining instance, where such a value exists. This corresponds to the state representing the mining instance, and its use hardens schemes against abuse. It is to be appreciated, however, that this is not necessary and that other security mechanisms may be used to avoid abuse in other embodiments.

In some embodiments, there is no use of a Merkle tree, nor is prior registration of a mining instance required. In the context of the figures described below, it is assumed that Merkle trees are used but this is not a requirement. In instances where no Merkle tree is used, analogous techniques are used wherein instead of using the Merkle tree representation value (referred to as value 110 in FIG. 1), a constant value is used, such as the value 0, or a value associated with the owner of the mining instance, where such a value may be a public key.

One benefit with PoS based mining is that it does not require a lot of power or a lot of time. To make ledgers not close too often (which would not promote any benefit, and which could cause inflation), the probability of success should be relatively low. Every time a new transaction is submitted, a new opportunity to mine would present itself in a system where the challenge depends on transactions that are submitted, as opposed to only on the ledger entries. Both types are described herein. If the ledger entries occur too frequently, the success probability can be automatically reduced, as described herein. Similarly, if the ledger closings are too infrequent, the success probability can be improved in an automatic manner, according to the same principle. If transactions arrive with reasonably tight inter-arrival intervals, then no miner can hope to control the mining by finding a transaction that would give them an advantage and then submit that, as by then, another transaction would be likely have been submitted. Verifiers and miners will determine the set of transactions to consider based on their arrival order, but may have different views since this is a decentralized system. It is understood that this is dealt with by permitting multiple branches of the ledger, but to automatically prune it down to one branch once the ledger grows sufficiently far beyond a first branch, which may be, for example, four ledger entries away. Any ledger portions that are "pruned away" in this sense are no longer considered, and any ledger entry corresponding to such portions are invalid, and the associated public keys not validated. However, all the branches would preferably take the same transactions as input. The selection of what branch to prune away is based on miner-based consensus, where ledger entries that include a larger number of valid transaction descriptions (that other miners are also aware of and are taking into consideration) are considered better, which could be done using a scoring system where each transaction is given a number of points, and transactions observed early on are given more points than transactions observed later, and wherein each miner assigns a score to a collection of transactions accordingly. Excluding one transaction or intentionally reordering transactions for the purposes of getting a challenge that can be answered will lead to a ledger entry with a lower associated score. After some number of ledger entries after a potential branch, the scores are compared and the highest-scoring branch selected to keep. This will be a distributed decision, where miners will be incentivized to mine on branches that are likely to survive the pruning. As a miner decides what transactions to include, it can only include transactions that have not yet been included in an already closed ledger for that particular branch.

In a PoS based system in which the challenge is only a function of old ledger entries and not on transactions that are submitted, another problem surfaces. If no miner has a response to a challenge, then this will not change as transactions are posted. One approach is to let only a small number of transactions be able to influence the challenges. We can call these super-transactions. These may be selected using methods similar to those used to compute the quality measure, where a transaction that is detected to be a super-transaction based on the evaluation of a quality measure on it would contribute to the challenge, modifying it, e.g., by taking at least portions of the super-transaction as input to the function that computes the challenge.

In some embodiments, a personalized challenge is computed from a global challenge. The personalized challenge may be a function of at least one of: the information associated with a mining instance, which is also referred to as the graph; the size of the graph; the Merkle tree associated with the graph, which is also referred to as a commitment to the graph; and a global difficulty parameter that is used to control all personalized challenges at the same time. An example of the global difficulty parameter is an offset value that is used to modify the difficulty of all personalized challenges, e.g., by doubling their difficulty, reducing their difficulty by 50%, etc. In some embodiments, the difficulty of a personalized challenge is modified by changing the matching criteria of a local quality function associated with the generation of a response from a global challenge, or the generation of a response from a personalized challenge. The local quality function is used as part of the challenge value to select what tentative responses, based on other parts of the personalized challenge, need to match a target value. The local quality function may also select the target value. It should be appreciated that there are many alternative variants of using portions of a challenge such as a personalized challenge to control the hardness of the challenge, including but not limited to: modifying the success criteria associated with the generation of a response; modifying the complexity of the generation of the response from the challenge; and modifying a target value that is controlled at least in part by the challenge.

A miner can store and use more than one graph, or portions thereof, and use one or more of these to attempt to mine, where mining comprises generating a response from a challenge, which can either be a global challenge or a personalized challenge. The miner can use the graphs one by one to mine, each one using a potentially different challenge. The miner can also use a combination of graphs to mine relative to a given challenge. For example, two or more graphs, referred to as a group, can be used, together with a given challenge, to generate one response. This corresponds to a situation where the constraints of each one of the graphs corresponding to the group is taken into consideration when generating a response to a challenge. This has potential benefits in terms of preventing against compression of graphs, as all the graphs of a group have to be compressed in a synchronized manner in order for the mining to be an efficiently computable task. Thus, in some embodiments, a collection of graphs are associated with each other in a "group." A group may include t different graphs. Each one of these graphs may have been generated independently of each other, but they are associated with each other by means of an action, which may be performed by the party that generated the graphs, or a party that performs mining, if different from the party that generated the graphs. One way of associating the graphs with each other is to generate a combined Merkle tree commitment for them. There are other ways of associating graphs with each other, including but not limited to receiving a digital signature on the group of graphs (or commitments for each one of them, combined).

When a response is generated to a challenge, this starts with a global challenge, which is the same for all miners. One example of a global challenge is a value that is generated from a predetermined set of ledgers, or parts thereof. For example, this may be the same set of ledger entries as was used in the most recent challenge, with one additional ledger entry added, this additional ledger entry being the one selected based on a global quality measure that relates to the ledger entries that have been submitted, including ledger entries that have not yet been included in any challenge, but which are still tentative. There are many methods for generating global challenges (also commonly referred to simply as "challenges"), and one of these can be used. From a global challenge, at least one local challenge is generated. In some embodiments, the local challenge is simply set as the global challenge. In other embodiments, the global challenge is combined with some information related to a graph or the graphs in a group, and a local challenge, specific to the graph or a group, is generated. For example, the local challenge CL may be computed as CL=hash(CG, commit(group)), where CG is the global challenge (at a particular point in time) and commit(group) is a value related to the group of graphs, and may be the root of a Merkle tree related to the set of graphs in the group. Here, hash( ) is a function such as a cryptographic hash function or another function that is hard to invert or which is many-to-one. In other embodiments, the local challenge is not specific to the group, and is instead specific to a miner. This can be done by computing CL=hash(CG, minerID), where minerID is an identity description of a miner, such as a public key of the miner, a representation of the graphs associated with the miner, or another commitment to a registered entity. Here, commit(group) corresponds to the Merkle root of the Merkle tree that combines the nodes of all the graphs of the group, e.g., by lining these up according to a preset order and generating the Merkle tree using the standard approach. Other commitments than standard Merkle trees can also be used, including but not limited to: using a tertiary Merkle tree instead of a binary Merkle tree. It should be noted that the alternative of using a tertiary Merkle tree may be used for all embodiments described herein.

To determine whether a group can be successfully mined with respect to a local challenge CL, a local quality QL measure is generated. In some embodiments, this measure QL is computed as a function of at least one part of one graph in a group, and compared to a target value. In some cases, the local challenge is preferably used to select one node from each graph in the group, where each of these selected nodes have the same index or have otherwise been associated with each other. For example, using the local challenge CL, a location L is selected, and the node, for each graph of a group, at the location L is selected. This set of nodes, represented by their values, is combined and is referred to as Group(L). Generating Group(L) is relatively easy for a miner that uses low compression or no compression at all, but is more computationally demanding for a miner that uses high compression. At least some parts of the local challenge CL and Group(L) are used to determine a value, and this value is compared with a target value. For example, the value V may be computed as V=hash(Group (L)), and its ten least significant bits, represented by LSB10 (V) compared with a target T, which may be a ten-bit string of zeros. It should be appreciated that other lengths of bits can be compared, and that this length can be a global variable that may depend on environmental observations such as the number of valid mining responses submitted for a recent ledger entry, or the time between two ledger entry closings. These would be distributively computable preferably, but could also depend on a controlling organization. The target T may be a fixed value, or may be a function of at least one of: the group of graphs; the miner identity; environmental observations; etc. It should be appreciated that compression in this context corresponds to at least one of a partial storage of node values and standardized compression methods in which space is traded against time.

The construction above helps deter very high compression rates, as a miner would have to generate all nodes at the location L for all the graphs of a group in order to determine the value of the local quality function. If the local quality function is satisfied, which happens when the target is matched, e.g., LSB(V)=T for a location L and the associated set of nodes Group(L), then the miner can submit a response. The response R comprises a set of nodes of at least one of the graphs associated with the group, where these are selected by identifying the predecessor of the node at location L, and at least one godparent located at least in part using the value associated with the predecessor node. The response R also comprises Merkle paths for the selected predecessor node and one or more godparent nodes as described previously. In addition, the response R further comprises Merkle tree paths for all the nodes in Group(L). In some embodiments, the response R comprises a sequence of nodes (including a predecessor and at least one godparent) for all of the graphs of the group. The value R may further comprise portions of the Merkle tree commitment, or an identifier of the Merkle tree, such as a pointer to a location in the ledger where the Merkle tree was committed to by submitting a value related to its root. Here, LSB corresponds to the least significant bits of a pre-specified number, relative to an input. Other functions to select a portion can also be used. For example, one can use XORing with a bit string mask of the same length as the input, where the mask identifies the locations to be selected.

To verify a challenge-response pair, a third party regenerates, using public values and values comprised in the challenge-response pair, the set of values, and verifies that these were correctly computed relative to the previously committed set of graphs, represented by their one or more Merkle tree commitments. Using the example described above, a third party receives a challenge-response pair (CG, R). It then computes L from CG, as described above, and verifies that the nodes of Group(L) are located at the proper location by verifying the Merkle paths for the nodes and verifying that the location they were taken from, based on the path, is L. The third party further verifies each sequence of nodes, including the node of a graph at location L, its predecessor, and its one or more godparents, as described above, verifying that these generate the value of the node at location L according to the generation algorithm. The third party further verifies that all of the nodes in the sequence of nodes were properly committed to by the Merkle paths. Various techniques may be used to perform all of these verifications. The third party further verifies that the target value T is matched using the nodes in Group(L), by performing the same computation as described above. Additional verifications can be performed by the third party in some embodiments. For example, the third party may also compute a global quality measure and verify that the submitted challenge-response pair satisfies this global quality measure, or alternatively, compute a global quality measure for one or more challenge-response pairs and identify the challenge-response pair that maximizes this global quality measure. One such global quality measure involves computing the distance between at least a portion of a value represented by a challenge-response pair and another value, such as the global challenge, another global quality measure, etc. This is used to identify the challenge-response pair with the highest quality measure. The verification may further involve a value related to a timed release function.

The generation of personalized challenges applies to graph structures other than those illustrated in this disclosure, and can also be used for structures that are not proof-of-space based and proof-of-capability based structures.

FIG. 1 illustrates a PoS implementation comprising a ledger component 101, a set of transactions 102, and a challenge 103 computed from at least some or a portion of the ledger component 101. Element 110 in FIG. 1 is a representation of a miner's state, and is preferably recorded in the ledger component 101. Those elements are preferably publicly available. In addition, the FIG. 1 example shows a collection of nodes such as 121, 122, 123, 124, 125 and 126. In this example, these are arranged in rows, where two rows 127 and 128 are shown. The nodes are stored by the miner, and are used at a setup time to compute value 110. This can be done using Merkle tree structure 111, or another structure such as a hash function, a compression function, or a combination of such. Challenge 103 is processed by the miner to obtain a personalized challenge 130 that can be the same as challenge 103, but which could also be an adjustment to account for the size of storage of the miner, as represented by the nodes the miner stores. For example, if the miner does not have a large amount of storage available or designated for use with the PoS system, personalized challenge 130 may preferably be an adjustment of challenge 103 that takes this into consideration, thereby making personalized challenge 130 suitable for the miner's memory configuration.

In some embodiments, the personalized challenge 130 indicates a selection of nodes, denoted in FIG. 1 by filled-in circles. In the FIG. 1 example, personalized challenge 130 corresponds to a selection of node 125, but not a selection of node 126. It further corresponds to a selection of nodes 121, 122, 123 and 124. In the FIG. 1 example, the personalized challenge corresponds to exactly one node per row, although this is not a requirement. The collection of nodes selected as a result of computing personalized challenge 130 corresponds to element 140. In a traditional PoS based mining scheme, 140 corresponds to a valid potential ledger entry. However, here a quality value 141 (also referred to herein as a qualifying function value) is also computed from challenge 103, or from other public information that is preferably not under the control of any one miner. The miner then performs a matching evaluation 142 to determine whether the set of selected nodes 140 match the quality value 141. This process takes into consideration what the memory constraints of the miner are, causing the evaluation 142 to succeed with a greater frequency for larger memory configurations than for smaller memory configurations, thereby leveling the playing field to make the likelihood of the evaluation 142 succeeding roughly proportional to the size of memory used to store the nodes used by the miner. It is to be appreciated that in some embodiments non-proportional relationships may be created by modifying the function used to compute the quality value 141. If the evaluation 142 results in success then the value 143 is output, where value 143 comprises selection 140, and preferably references the value 110 or the ledger position in which this was recorded.

In some embodiments, nodes 121, 122, 123, 124, 125 and 126 are public keys. As the miner submits a valid ledger entry, corresponding to a challenge-response pair comprising one of these nodes, such as node 123, this public key value becomes the public key value associated with the coin the miner obtains, and the miner would use the corresponding secret key, which is not shown in the image, to sign transaction requests, such as purchases. It is to be appreciated that any type of digital signature can be used in this context, such as RSA signatures, Merkle signatures, DSS signatures, etc. Further, the nodes 121, 122, 123, 124, 125 and 126 may correspond to different public keys or to the same public key, the latter preferably augmented with a counter or other location indicator such as a matrix position indicator, as described above.

Figure 2:
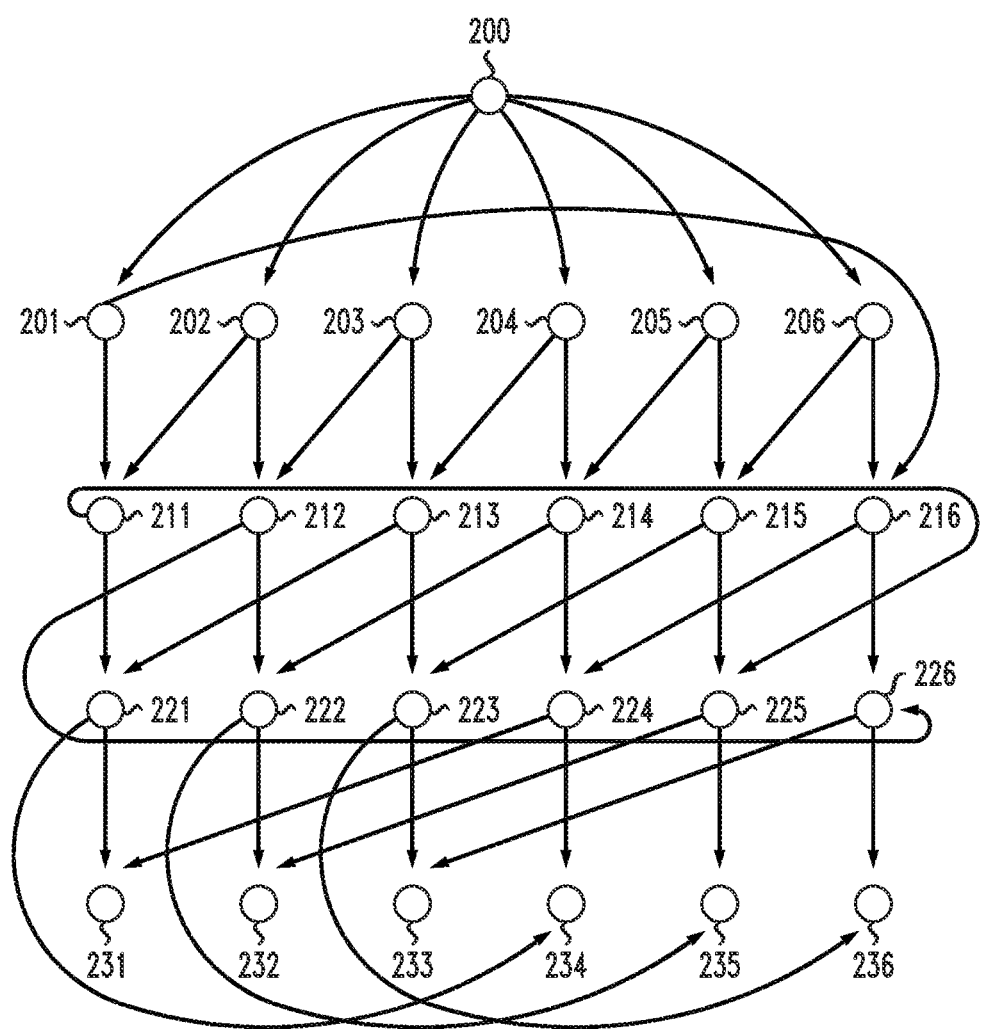
FIG. 2 shows an example of relationships between nodes that may be stored by a miner in a Proof of Space based mining system, in accordance with an illustrative embodiment of the invention.

FIG. 2 shows an example of relationships between nodes that may be stored by a miner. Value 200 is a seed used to generate values 201, 202, 203, 204, 205 and 206, which correspond to a first row. The values in the first row are then used to compute the values of the second row, i.e., the node values 211, 212, 213, 214, 215 and 216. In the FIG. 2 example, value 211 is derived from values 201 and 202, e.g., by combining these values and applying a function. For example, values 201 and 202 may be concatenated and input to a cryptographic hash function, such as SHA-1. Similarly, value 222 is generated from values 212 and 214. The pattern of generation does not have to involve only values from the row above being used to derive a value. More generally, a pattern of any DAG can be used. The result is a series of values that were derived last, i.e., which were not used for the derivation of any other node values in the collection. In this example, that is the series of values 231, 232, 233, 234, 235 and 236. It is to be appreciated that other graphs of node relationships may be used in other embodiments, and that some nodes may have larger numbers of depending ancestor nodes than others. For example, one level may have nodes that only depend on two ancestor nodes, whereas another level may have nodes that depend on ten ancestor nodes. Similarly, different levels may have different numbers of nodes, and some nodes may depend on nodes from levels higher up than the level right above. The DAG shown in FIG. 2 is thus presented by way of example only, and embodiments are not limited to use with this specific DAG.

Turning to mining for a moment, the personalized challenge 130 may be, by way of example, a value in the range 1-6, selecting one of the values that were derived last such as value 232. Value 232 is therefore part of the response 140 to the personalized challenge 130. In addition, response 140, which represents a potential ledger entry, may also comprise the values needed to generate node 232, or some portion thereof. In this example, that selection comprises the node values 222 and 225. In some embodiments, both of these are "tracked back" in the same way as value 232 was tracked back to values 222 and 225 by including these values in the response 140. In other embodiments, only one of the values 222 and 225 is tracked back. For example, the miner may choose the value 222 based on an evaluation function indicating that 222 satisfies some criteria that 225 does not satisfy, e.g., that the value 222 has a smaller Hamming distance to the personalized challenge 130 than the value 225 does. In this example, that would cause node value 222 to be tracked back, and values 212 and 214 included in the response 140. Using the same selection criteria, the Hamming distances between these two values and personalized challenge 130 are computed. In this example, this results in the same distance, causing a deterministic tie-breaking function to be used. For example, the larger of the two values may be selected for tracking back, or the one whose node identification number (such as 201 or 202) is the smallest. In this example, that selected tie-broken value may correspond to node value 212. Accordingly, values 202 and 203 are included in the response 140.

In another example, the personalized challenge 130 may directly select a collection of nodes, such as nodes, 201, 211, 226 and 233, and these are included in the response 140 along with all the nodes that are their direct ancestors.

Figure 3:
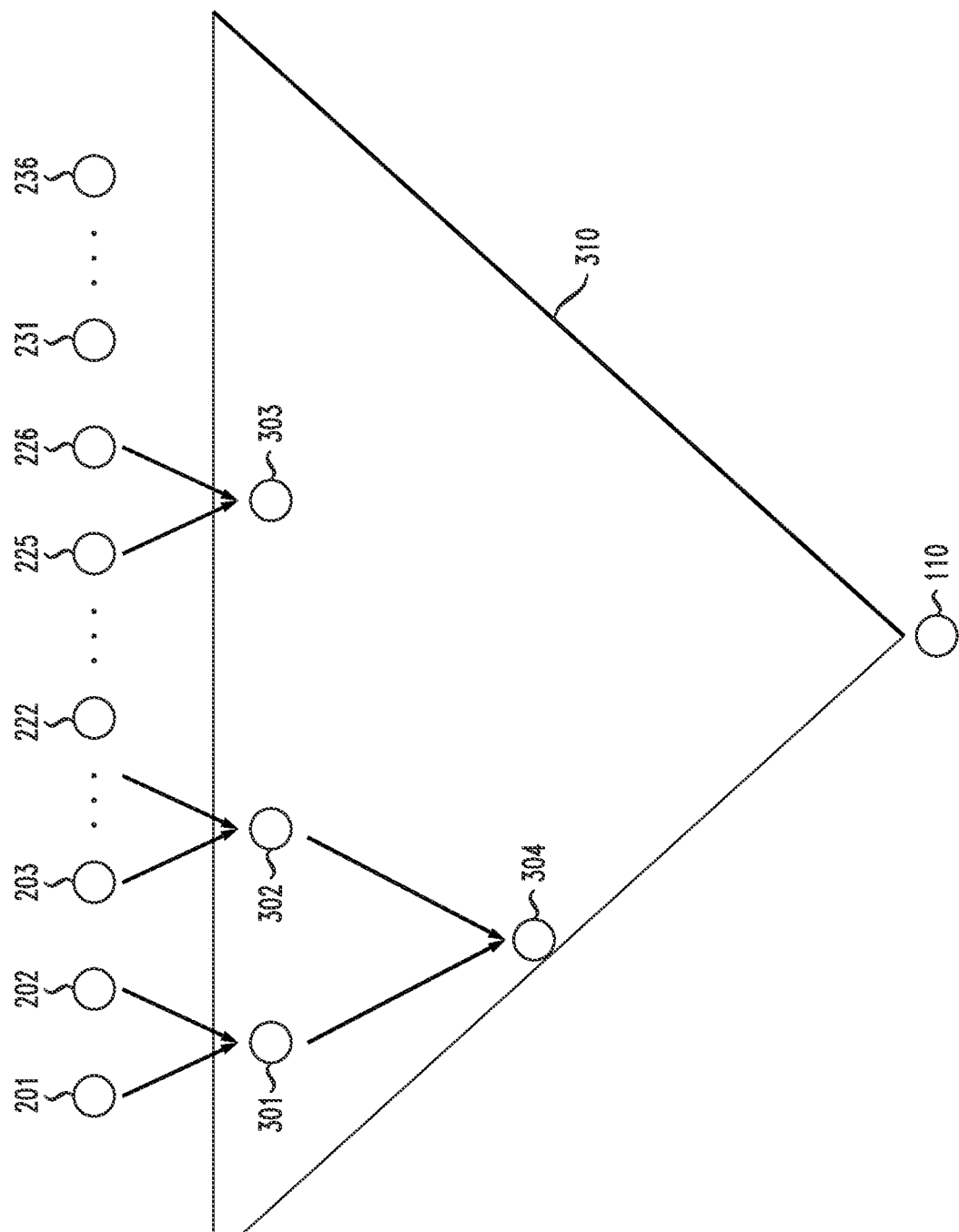
FIG. 3 shows an example of combining nodes in a Merkle structure to generate a value representing a miner's state, in accordance with an illustrative embodiment of the invention.

FIG. 3 shows how nodes 201, 202, ... 236 are combined in a Merkle structure 310 to generate value 110 or a portion thereof. Here, values such as node values 201 and 202 are combined to obtain value 301, and similarly, node values 203 and 204 (not shown) are combined to obtain value 302, where values 301 and 302 are, in turn, combined to obtain value 304. Similarly, node values 225 and 226 may be combined to obtain value 303. Here, the combination operation may be performed by concatenating and applying a cryptographic hash function. This is repeated for all the nodes and the resulting values, iteratively, until a single value 110 is obtained. If the number of input values is not a power of two, then the "missing" values needed to make it a power of two can be set to a constant value, such as the value 0. Therefore, each set of nodes 201, 202, . . . 236 can be represented as a single value 110. This value is preferably made public before mining commences for the miner corresponding to the value 110, where this can be done by submitting the value 110 as a transaction to be included in the ledger, or as part of such a transaction value—for example, by linking it to a small payment wherein the payment is made in reference to the value 110. This can comprise a registration cost that the miner cannot recover other than by mining, and could be performed by paying the owner of the coin used in the transaction a small amount, such as $1, and make the value 110 the "recipient" of the payment. In contrast, normally a payment is made to a public key, allowing the owner of the corresponding secret key to turn around and spend the corresponding amount later on. It should be appreciated that there are variations on the common binary Merkle structure that can be used for the purpose of representing the nodes of the mining instance in one state value in other embodiments.

Figure 4:
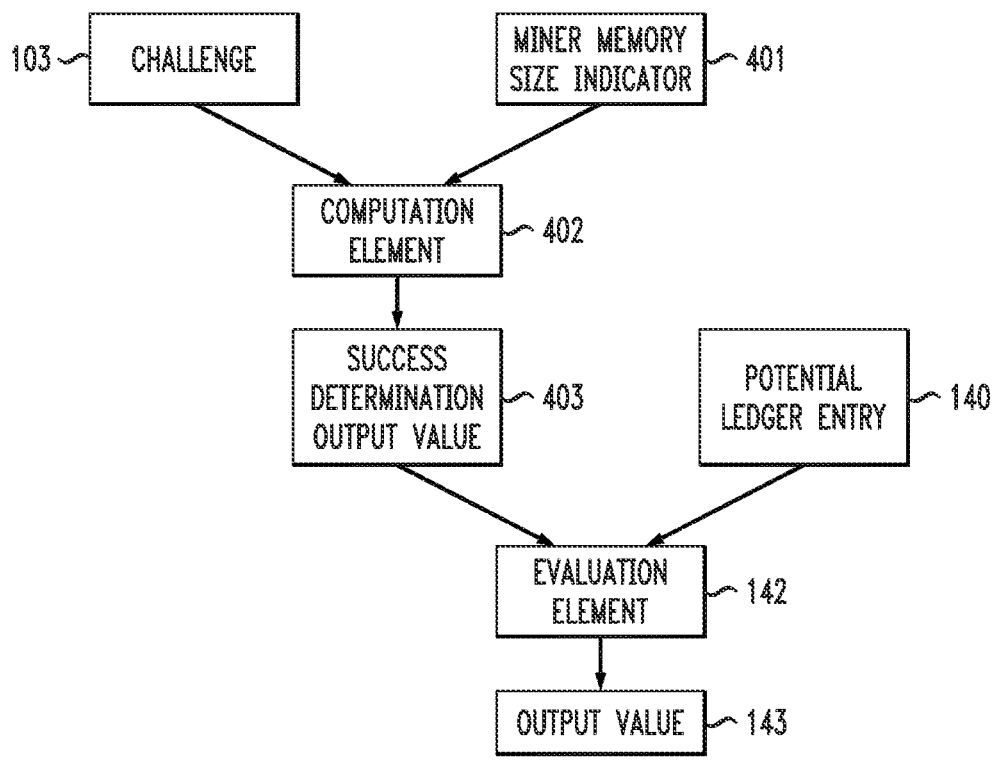
FIG. 4 shows an example process for generating a quality measure for use in performing a qualifying determination, in accordance with an illustrative embodiment of the invention.

FIG. 4 shows an example quality measure determination. Here, challenge 103 is a value that is deterministically determined from a public value that is at least in part portions of the ledger, and value 401 corresponds to the size of the memory the miner is using, and could correspond to an indication, for example, that the memory size is $1/1024$ of the "maximum" memory size for a PoS instance. Values 103 and 401 are input to element 402 that performs a computation, generating an output 403 that is a string or other value to be used to determine success. In this example, value 403 may indicate that out of ten bits, the least significant bit should be a 1 and the remaining bits should be 0. This corresponds to an event that occurs $1/1024$ of the time. Another potential value 403 is the string 0100110011, which is another ten bit string, and therefore also has a probability of $1/1024$ to be selected if selected uniformly at random. The length of the string is caused by the value 401 and the value of the string is caused by the value 103. In some embodiments, a constant is used instead of value 103, although using value 103 has security benefits in that it makes output value 403 a priori unpredictable to the miner. If the memory size is not a fraction of that maximum where this fraction is one over a power of two, then 401 can comprise a collection of strings, such as one four-bit string and one ten-bit string. This particular example corresponds to a success probability of $1/16+1/1024$. In other embodiments, all success probabilities are reduced, e.g., by a factor $1/256$, making success correspondingly less likely. This applies to all instances, independently of and in conjunction with the reduction due to the size indicator 401. In some embodiments, the quality measure is part of the personalized challenge. In other embodiments, the quality measure is computed from at least one of the challenge and the personalized challenge. In still other embodiments, the quality measure is computed from at least a portion of the public ledger. The quality measure is used to control the relative success rate of two or more mining instances with the same or different corresponding memory configuration sizes. The quality measure is also used to control the absolute success rate of one or more mining instances by reducing the success of a proof of space based mining instance or component to meet a target probability.

Element 142 uses the value 403 to determine whether the mining result 140 is valid or not. If some predicate of value 140 matches value 403, then this corresponds to success. In the case where value 403 corresponds to multiple strings, as described above, success corresponds to at least one of these strings matching value 140. One example approach of evaluating this match is to generate a hash value from value 140 and select the least significant portion of a length matching value 403, determining if there is a bit-by-bit match for any of the string segments, whether one or more. If there is such a match, then the value 140 is determined to be valid and is output. Value 143 comprises value 140 and value 401. Value 401 can be verified based on value 110 and the associated inputs. In some embodiments, value 110 preferably also has an auxiliary input indicating the memory size corresponding to value 401. This can be achieved by inserting the auxiliary information in the input to the Merkle tree generation, such as in the form of one leaf, i.e., input. In some embodiments, this counter value is prepended to the list of node values 201, 202, . . . 236. In some embodiments, additional auxiliary information is also added to the generation of the value 110 at the time of setup. Such auxiliary information can also be added to the value 110 by concatenating the auxiliary information to the output of the Merkle tree computation and using this as value 110. When a miner wishes to determine whether a potential ledger entry is valid, it would verify the corresponding node values 140, and that these are consistent with a previously publicized Merkle tree root value 110, and that the quality measure function, which is public and deterministic, indicates that the value 143 is valid. This corresponds to the value 140 being valid and matching the value 403 generated from the previously recorded value 401 and the public challenge value 103. If this is all correct, then the miner concludes that 143 is a legitimate ledger value, or part of it. This approach can be used to modify proposed cryptographic currency schemes, including but not limited to "SpaceMint: A Cryptocurrency Based on Proofs of Space" by Sunoo Park, Albert Kwon, Joel Alwen, Georg Fuchsbauer, Peter Gazi and Krzysztof Pietrzak. This approach can be applied by using the process described above to take a challenge value 103 or other public value and a memory size descriptor 401 and generate a value 403 used to determine whether a tentative ledger value 140 matches quality criteria corresponding with the function of element 402 and element 142, and values 103 and 401.

Figure 5:
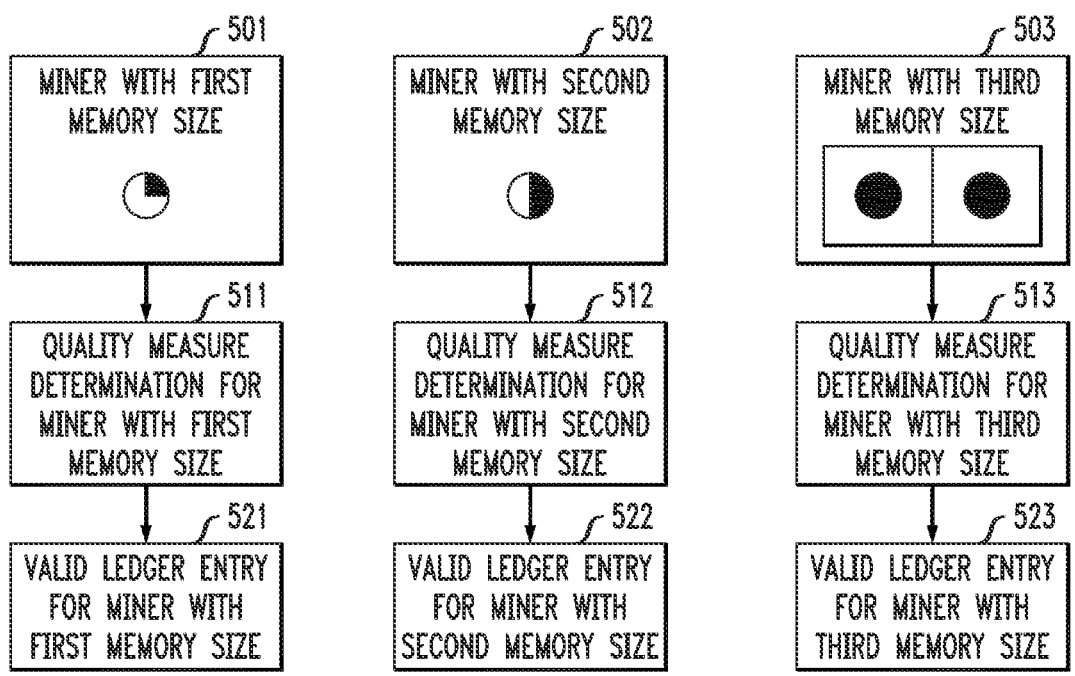
FIG. 5 shows an example of multiple miners in a Proof of Space based mining system with different memory configurations, in accordance with an illustrative embodiment of the invention.

FIG. 5 illustrates three miners 501, 502 and 503 in a PoS based system with various associated memory sizes or configurations (e.g., different amounts of storage set aside, available or otherwise designated for use in mining in the PoS based system). Miner 501 is represented with a quarter pie, miner 502 is represented by a half pie, and miner 503 is represented by two full pies. Miner 501 uses a quarter of the maximum storage for a PoS instance, miner 502 uses a half of the maximum storage, and miner 503 uses twice the maximum storage. In some embodiments, the maximum size PoS instance may require approximately one terabyte (TB) of storage. In this example, the miner 501 has a quarter of that storage capacity (e.g., approximately 250 gigabytes (GB)) set aside, available or otherwise designated for mining, the miner 502 has a half of that storage capacity (e.g., approximately 500 GB) set aside, available or otherwise designated for mining, and the miner 503 has twice that amount (e.g., approximately 2 TB) set aside, available or otherwise designated for mining. The elements 511, 512 and 513 in FIG. 5 correspond to a quality measure determination (e.g., the quality measure determination described above with respect to FIG. 4). In some embodiments, the elements 511, 512 and 513 are configured so that a miner with the maximum storage has approximately a probability of $1/2048$ for a valid collection 140 to be determined to be a valid ledger entry. Accordingly, the probability of success for one attempt is approximately $1/1024$ for miner 503, $1/4096$ for miner 502 and $1/8192$ for miner 501. This corresponds to the expected probability of the respective quality assessment elements 513, 512 and 511 outputting valid ledger entries 523, 522 and 521, given a random challenge 103, which is proportional to their memory sizes. If the quality assessment element 511 would result in success with a non-negligibly higher probability than half of that for the quality assessment element 512, provided the connections shown in the figure, then this would encourage miners to run multiple small instances instead of a larger instance of the same size as the cumulative sizes of the small instances, unless there is a limitation put in place addressing how many instances any party may register. Conversely, if the probability of success for miner 501 combined with quality measure element 511 were substantially less than half of the success expected from miner 502 combined with quality measure element 512, then this encourages larger parties, which encourages mining pools. Mining pools are understood to cause unwanted behavior such as fraud, so it is beneficial to create incentives for mining that avoids the use of mining pools and which does not favor larger parties at the cost of smaller parties.

Figure 6:
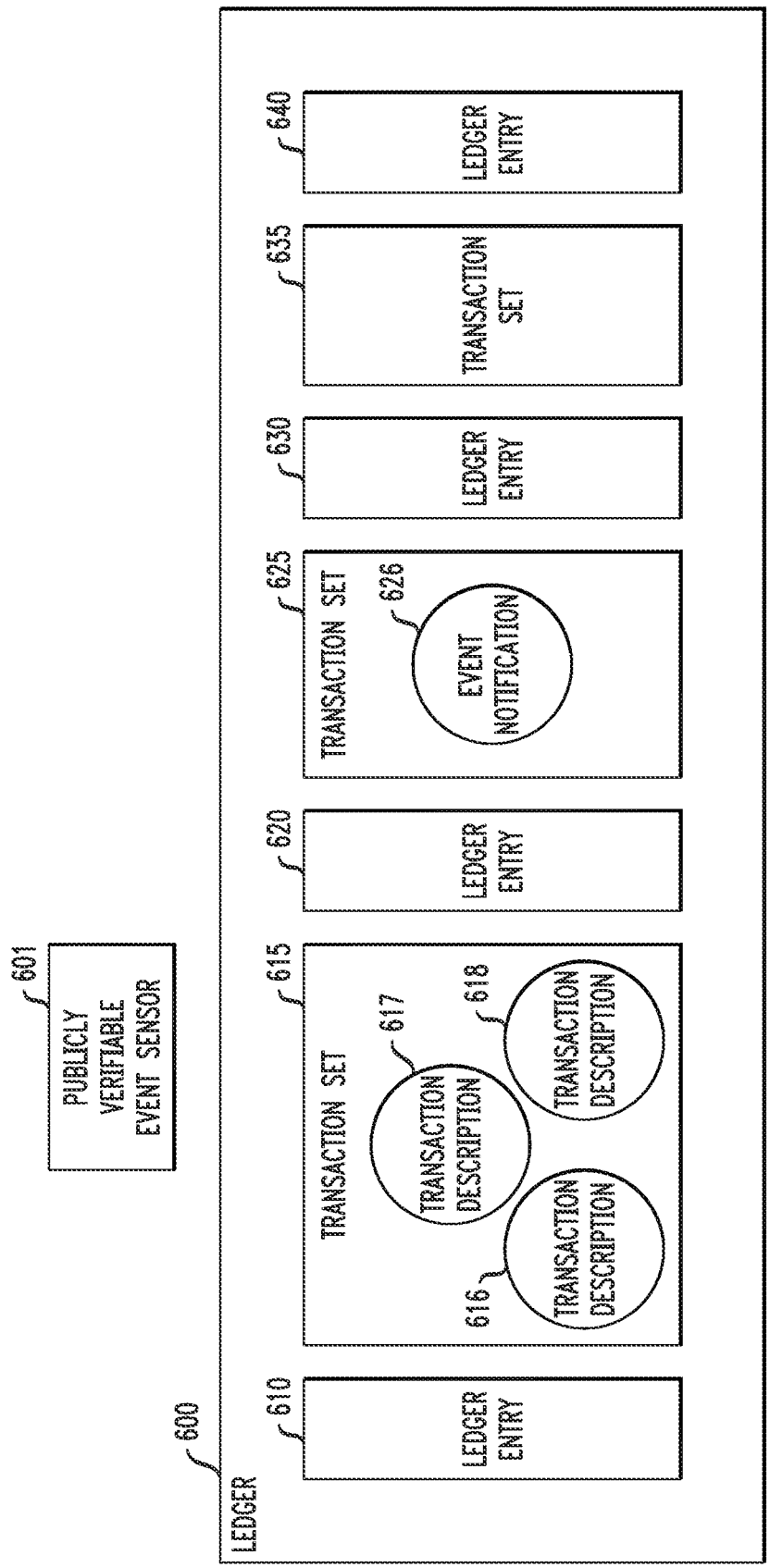
FIG. 6 shows an example of a portion of a ledger with entries and associated transaction sets, in accordance with an illustrative embodiment of the invention.

FIG. 6 shows a portion of a ledger 600 comprising ledger entries 610, 620, 630 and 640, and transaction sets 615, 625 and 635, each corresponding to zero or more transaction descriptions. For transaction set 615, three transaction descriptions 616, 617 and 618 are shown. Here, 616 corresponds to a purchase in which value is transferred from one previously mined coin and its associated first public key to a second public key associated with a party other than the owner of the first public key. The transaction is said to have taken place after the ledger is closed, which in some embodiments is when ledger entry 620 has been added, but which in another embodiment is when another and later ledger entry has been added, such as ledger entry 640. Transaction 616 corresponds to the recording of a value 110 for a miner, allowing this miner to participate after the ledger has been closed. Transaction 617 corresponds to the recording of a deed for the purchase of a home, or any other public statement that needs to be recorded and/or time-stamped. Sensor 601 is a detector of a publicly verifiable event, such as: the value of a coin exceeding $50; fewer than 1000 transactions being recorded in a transaction set such as transaction set 615; the time interval between two consecutive ledger entries 610 and 620 being added is shorter than 100 milliseconds (ms); etc. As the sensor 601 detects the event, a notification transaction 626 is added to the next open transaction set, identifying that a rule associated with the event should be applied. There may be multiple rules. One example rule is that for one of the example events described above, the difficulty of mining should be doubled for everybody, meaning that the probability associated with the quality measure or assessment, and with the generation in element 402 and comparison in element 142, should be reduced to half for all miners, based on the probability associated with the value 401 associated with the memory size of the miner. In some embodiments, this change preferably does not take effect until after the next ledger entry 630 has been added and verified. In some embodiments, this change does not take effect until yet a later ledger entry, such as the tenth consecutive ledger entry made after the addition of event notification 626 to transaction collection 625. The delay has a benefit in that it stabilizes the system by making sure that there is consensus. All miners need to observe ledger entries such as the notification 626 to make sure that their mining efforts are meaningful. Similarly, miners also need to verify ledger entries and that they are valid, including that they have a valid evaluation of the quality measure. Not doing that will render their mining efforts meaningless, as they will build on invalid ledger entries.

Figure 7:
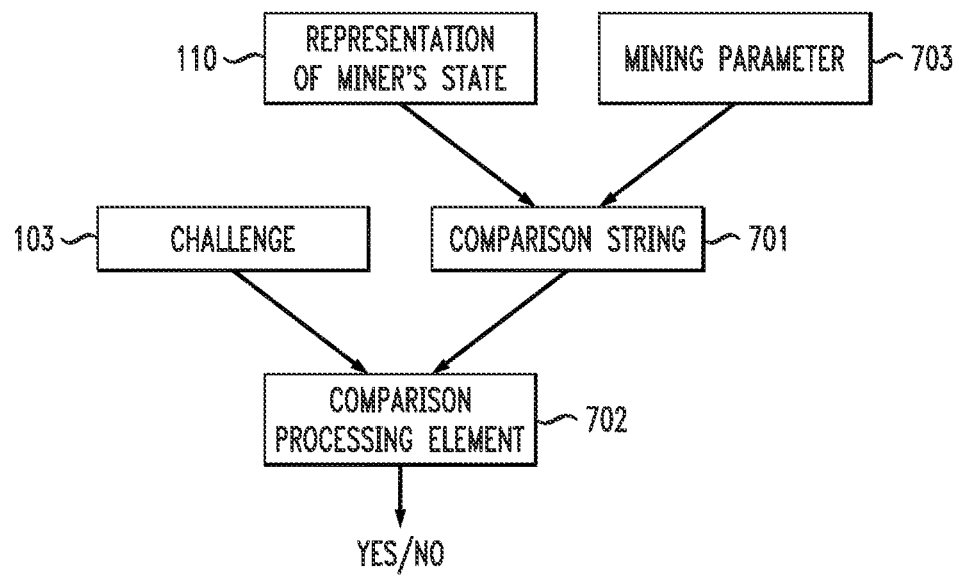
FIG. 7 shows an example process for determining whether a given challenge is a valid challenge for a given mining instance, in accordance with an illustrative embodiment of the invention.

FIG. 7 shows an embodiment where the challenge 103 is processed to determine whether it is a valid challenge with respect to a given mining instance. This process can also be applied to personalized challenge 130. The process generates a comparison string 701. In one instance, shown in this figure, this comprises the value 110 and a parameter 703 that is representative of the size of the mining instance, e.g., indicating whether it is a maximum size instance, a half-of-maximum instance, a quarter-of-maximum instance, or any other fraction of maximum or any particular size that is permitted. In addition, parameter 703 may depend on an input value that represents the extent to which all mining instances are affected by a reduction in the mining probability, which could either be a constant value or a variable that depends on observed events. In this example, comparison string 701 corresponds to an indication that the twelve least significant bits of challenge 103 will be selected and compared to a string that depends on value 110, parameter 703, a constant, a combination of these, or portions thereof. In other embodiments, multiple selections will be made, each one of which is later evaluated independently, an action taken if at least one indicates validity. Using process 702, a portion of the bit string corresponding to value 103 is compared with comparison string 701. The process 702 outputs a binary value, in this example shown as yes/no, that indicates whether the comparison resulted in equality or not. In embodiments where 701 represents multiple strings to be compared to multiple parts of the bit string corresponding to value 103, process 702 performs these multiple comparisons and outputs yes if and only if at least one of the comparisons results in an equality. In other embodiments, process 702 first applies a function such as a one-way hash or a cyclic redundancy check (CRC) to input value 103 before performing the one or more comparisons. If the output of the process, which is a quality assessment process, is yes, then the challenge 103 is used to determine whether a response can be generated. In some embodiments, this is preferably done by generating a personalized challenge 130 from challenge 103, and by generating a response collection from the personalized challenge as described above. However, if the process 702 outputs 'no', then the mining effort is not applied, since this is not a valid challenge for the PoS instance. If a miner operates multiple PoS instances, then this determination is applied to each one of the instances.

Figure 8:
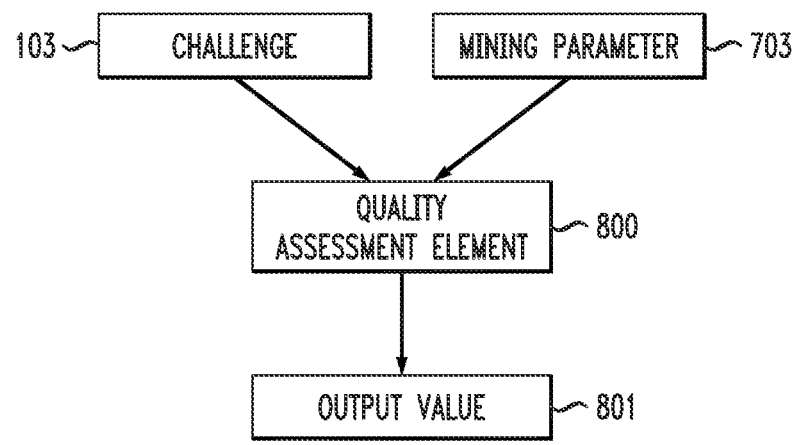
FIG. 8 shows an example of a quality assessment function for use in determining whether a response computed from a challenge and at least one value associated with a mining instance satisfies one or more qualification criteria, in accordance with an illustrative embodiment of the invention.

FIG. 8 shows another example of a quality assessment function that may be used in some embodiments. In the FIG. 8 example, challenge 103 and parameter 703 are provided to process 800, which causes a string 801 to be selected and output. For example, if parameter 703 indicates that the mining should succeed with a probability of $1/256$, then output 801 can be computed as 8 bits of a function of value 103, where the function may be the identity function, a CRC, a hash function such as a cryptographic hash function, or an algebraic function. For example, this output 801 may be the string "01001011". This is then compared to a portion of value 110 to determine whether the challenge 103 is valid for the mining instance corresponding to value 110. In some embodiments, this comparison is made to the least significant bits of value 110, where the same-length string as the length of output 801 is compared. If there is a match, then mining proceeds as described above, otherwise not. It is pointless for a miner to proceed with the mining if there is no match, since other miners will verify that the challenge was valid before accepting a ledger entry as valid. In embodiments where the success probability is not one over a power of two, then output 801 corresponds to a series of strings, each one of which is compared to non-overlapping segments of value 110, and if one of the comparisons results in a match, as described above, then the challenge 103 is considered valid, but otherwise not. It is to be appreciated that there may be many other variations on these concepts, and that other quality assessment processes can be generated using these principles. Such quality assessment processes may be applied to existing cryptographic currency mining schemes, or to mining schemes that are built around or based at least in part on the notion of utilizing quality assessments described herein. As shown, the quality assessment can be made to different values, such as the challenge 103 or a tentative response 140. It is to be appreciated, however, that quality assessment can also be applied to other values, such as individual node values or collections of such, to determine whether they can be used in a particular response, and to other parameters and values used in the process of mining.

The embodiments described above are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system entities, relative to the miners and verifiers and other entities of certain ones of the illustrative embodiments described above.

Miner and verifier entities, as well as other entities described herein, may be part of or may be implemented using one or more information processing systems. FIG. 9 shows an example of an information processing system 900 that may be utilized to implement miner, verifier and other entities described herein. The information processing system 900 in FIG. 9 includes a plurality of processing devices 902-1, 902-2, 902-3, . . . 902-K (collectively, processing devices 902), which communicate with one another over a network 904.

A given miner, verifier or other entity in an information processing system as described herein is illustratively configured utilizing a corresponding one of the processing devices 902, such as processing device 902-1, which comprises a processor 910 coupled to a memory 912. The processor executes software program code stored in the memory in order to control the performance of processing operations and other functionality. The processing device 902-1 also comprises a network interface 914 that supports communication over one or more networks such as network 904.

The processor 910 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

The memory 912 stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, read-only memory (ROM), magnetic memory, optical memory, or other types of storage devices in any combination.

Although not shown in FIG. 9, other ones of the processing devices 902-2 through 902-K are assumed to be similarly configured with respective processors, memories and network interfaces.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with the embodiments described herein.

One or more of the processing devices 902 in a given embodiment can include, for example, laptop, tablet or desktop personal computers, mobile telephones, or other types of computers or communication devices, in any combination.

Communications between the various elements of an information processing system 900 comprising processing devices 902 associated with respective parties or other system entities may take place over one or more networks, represented in FIG. 9 as network 904. Such networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. As indicated previously, the network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. As indicated above, the processor may comprise a microprocessor, a microcontroller, an ASIC, an FPGA or other type of processing circuitry, as well as portions or combinations of such circuitry elements. The memory may comprise RAM, ROM or other types of memory, in any combination. Again, the memory and other memories disclosed herein should be viewed as illustrative examples of what are more generally referred to as "processor-readable storage media" storing program code of one or more software programs.

As mentioned previously, articles of manufacture comprising such processor-readable storage media are considered embodiments of the present invention. A given such article of manufacture may comprise, for example, a storage array, a storage disk, an integrated circuit containing RAM, ROM or other electronic memory, or any of a wide variety of other types of computer program products.

Also included in the processing device is network interface circuitry, which is used to interface the processing device with the network and other system components, and may comprise conventional transceivers.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components or functionality of the system as disclosed herein can be implemented at least in part in the form of one or more software programs stored in memory and executed by a processor of a processing device.

Accordingly, a given component of an information processing system implementing functionality as described herein is illustratively configured utilizing a corresponding processing device comprising a processor coupled to a memory. The processor executes program code stored in the memory in order to control the performance of processing operations and other functionality. The processing device also comprises a network interface that supports communication over one or more networks.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts. The disclosed techniques can be similarly adapted for use in a wide variety of other types of information processing systems.

It is also to be appreciated that the particular process steps used in the embodiments described above are exemplary only, and other embodiments can utilize different types and arrangements of processing operations. For example, certain process steps described as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, networks and devices than those utilized in the particular illustrative embodiments described herein, and in numerous alternative PoS processing contexts. Also, the particular types and configurations of root values, leaf values, path values, challenges, ledger values, proofs of space, match functions, quality assessments, etc. can be varied in other embodiments. Furthermore, the various types of contexts in which PoS are utilized can be varied. In addition, the particular assumptions made herein in the context of describing certain embodiments need not apply in other embodiments. These and numerous other alternative embodiments will be readily apparent to those skilled in the art.

What is claimed is:

1. An apparatus, comprising:
at least one processing device comprising a processor coupled to a memory, the at least one processing device implementing a verifying entity of a decentralized system configured:
to receive information associated with at least one ledger entry of a distributed ledger of the decentralized system;
to verify at least a portion of one or more computations associated with the received information;
to generate evidence of at least one error in said at least a portion of the one or more computations associated with the received information; and
to associate the generated evidence with a public key of the verifying entity;
wherein the decentralized system comprises a proof of space based mining system, and wherein said at least one ledger entry of the distributed ledger comprises at least one proof of space for the proof of space based mining system;
wherein the verifying entity is further configured to provide, to one or more mining operator entities in the proof of space based mining system, a proof of knowledge of said at least one error; and
wherein submission of the proof of knowledge of said at least one error entitles the verifying entity to a bounty, the bounty comprising at least a fraction of a value obtained by successful mining in the proof of space based mining system.

2. The apparatus of claim 1 wherein the public key is associated with a secret key, the secret key being associated with a financial capability of the verifying entity.

3. The apparatus of claim 1 wherein the verifying entity comprises a bounty hunter entity in the proof of space based mining system, the bounty hunter entity being configured to verify said at least a portion of the one or more computations associated with the received information to enforce one or more policies in the proof of space based mining system.

4. The apparatus of claim 1 wherein the proof of knowledge of said at least one error comprises a proof of knowledge of a secret key associated with the public key.

5. An apparatus, comprising:
at least one processing device comprising a processor coupled to a memory, the at least one processing device implementing a verifying entity of a decentralized system configured:
to receive information associated with at least one ledger entry of a distributed ledger of the decentralized system;
to verify at least a portion of one or more computations associated with the received information;
to generate evidence of at least one error in said at least a portion of the one or more computations associated with the received information; and
to associate the generated evidence with a public key of the verifying entity;
wherein the decentralized system comprises a proof of space based mining system, and wherein said at least one ledger entry of the distributed ledger comprises at least one proof of space for the proof of space based mining system;
wherein the verifying entity is further configured to provide, to one or more mining operator entities in the proof of space based mining system, a proof of knowledge of said at least one error; and
wherein providing the proof of knowledge of said at least one error comprises:
submitting, at a first point in time, a first transaction to the distributed ledger comprising the public key and an encryption of the generated evidence; and
submitting, at a second point in time, a second transaction to the distributed ledger comprising a decryption key for decrypting the encryption of the generated evidence in the first transaction.

6. The apparatus of claim 1 wherein the one or more computations associated with the received information comprise a plurality of iterations of hash function, and wherein the generated evidence comprises a value that is a preimage to a node value which, when the hash function is applied, does not produce the node value.

7. A method comprising:
receiving information associated with at least one ledger entry of a distributed ledger of a decentralized system;
verifying at least a portion of one or more computations associated with the received information;
generating evidence of at least one error in said at least a portion of the one or more computations associated with the received information; and
associating the generated evidence with a public key of the verifying entity;

wherein the method is performed by at least one processing device comprising a processor coupled to a memory implementing a verifying entity of the decentralized system;
wherein the decentralized system comprises a proof of space based mining system, and wherein said at least one ledger entry of the distributed ledger comprises at least one proof of space for the proof of space based mining system;
wherein the method further comprises providing, from the verifying entity to one or more mining operator entities in the proof of space based mining system, a proof of knowledge of said at least one error; and
wherein submission of the proof of knowledge of said at least one error entitles the verifying entity to a bounty, the bounty comprising at least a fraction of a value obtained by successful mining in the proof of space based mining system.

8. The method of claim 7 wherein the verifying entity comprises a bounty hunter entity in the proof of space based mining system, the bounty hunter entity being configured to verify said at least a portion of the one or more computations associated with the received information to enforce one or more policies in the proof of space based mining system.

9. A computer program product comprising a non-transitory processor-readable storage medium having stored therein program code of one or more software programs, wherein the program code when executed by the at least one processing device causes the at least one processing device to perform the steps of the method of claim 7.

10. An apparatus comprising:
at least one processing device comprising a processor coupled to a memory, the at least one processing device implementing a mining operator entity of a decentralized system configured:
to generate a challenge based at least in part on at least a portion of content of a distributed ledger of the decentralized system;
to select, based at least in part on the generated challenge, at least one first node of a graph stored by the mining operator entity;
to select, based at least in part on the at least one first node, at least one second node of the graph;
to generate, based at least in part on the at least one second node, a response to the generated challenge;
to determine a value of a quality function that takes as input the generated response to the generated challenge; and
to submit, based at least in part on the determined value of the quality function, an entry to the distributed ledger, the entry comprising at least a portion of the generated response to the generated challenge;
wherein the decentralized system comprises a proof of space based mining system, and wherein said at least one ledger entry of the distributed ledger comprises at least one proof of space for the proof of space based mining system;
wherein the mining operator entity is configured to receive, from a verifying entity in the proof of space based mining system, a proof of knowledge of said at least one error; and
wherein submission of the proof of knowledge of said at least one error entitles the verifying entity to a bounty, the bounty comprising at least a fraction of a value obtained by successful mining in the proof of space based mining system.

11. The apparatus of claim 10 wherein the entry further comprises at least a portion of the generated challenge.

12. The apparatus of claim 10 wherein the entry is associated with at least one of a public key and a secret key generated by the mining operator entity.

13. The apparatus of claim 10 wherein the mining operator entity is further configured, prior to generating the challenge, to register the graph in the decentralized system.

14. The apparatus of claim 13 wherein registering the graph in the decentralized system comprises the mining operator entity committing to the graph.

15. The apparatus of claim 14 wherein committing to the graph comprises submitting a value representative of the graph to be stored on the distributed ledger.

16. The apparatus of claim 5 wherein the public key is associated with a secret key, the secret key being associated with a financial capability of the verifying entity.

17. The apparatus of claim 5 wherein the verifying entity comprises a bounty hunter entity in the proof of space based mining system, the bounty hunter entity being configured to verify said at least a portion of the one or more computations associated with the received information to enforce one or more policies in the proof of space based mining system.

18. The method of claim 7 herein the public key is associated with a secret key, the secret key being associated with a financial capability of the verifying entity.

19. The method of claim 7 wherein providing the proof of knowledge of said at least one error comprises:
    submitting, at a first point in time, a first transaction to the distributed ledger comprising the public key and an encryption of the generated evidence; and
    submitting, at a second point in time, a second transaction to the distributed ledger comprising a decryption key for decrypting the encryption of the generated evidence in the first transaction.

\* \* \* \* \*

UNITED STATES PATENT AND TRADEMARK OFFICE
CERTIFICATE OF CORRECTION

PATENT NO. : 11,714,860 B2
APPLICATION NO. : 17/328344
DATED : August 1, 2023
INVENTOR(S) : Bjorn Markus Jakobsson It is certified that error appears in the above-identified patent and that said Letters Patent is hereby corrected as shown below:

In the Claims

Column 28: (Claim 1, Line 58) replace "system, and wherein" with --system; wherein--.
Column 29: (Claim 5, Line 33) replace "system, and wherein" with --system; wherein--; (Claim 7, Line 16) replace "the verifying" with --a verifying--.
Column 30: (Claim 7, Line 6) replace "system, and wherein" with --system; wherein--; (Claim 10, Line 55-56) delete "at least one ledger"; (Claim 10, Line 55) replace "system, and wherein" with --system; wherein--; (Claim 10, Line 56) replace "of" with --to--.

Signed and Sealed this
Ninth Day of January, 2024

Katherine Kelly Vidal
*Director of the United States Patent and Trademark Office*